(12) United States Patent
Tanabe et al.

(10) Patent No.: US 7,472,685 B2
(45) Date of Patent: Jan. 6, 2009

(54) CONTROL METHOD AND CONTROL APPARATUS OF INTERNAL COMBUSTION ENGINE

(75) Inventors: Kazuya Tanabe, Wako (JP); Takashi Tsutsumizaki, Wako (JP); Yutaka Inomoto, Wako (JP); Kosuke Tsunashima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 434 days.

(21) Appl. No.: 10/577,711

(22) PCT Filed: Jan. 20, 2005

(86) PCT No.: PCT/JP2005/001032

§ 371 (c)(1),
(2), (4) Date: May 2, 2006

(87) PCT Pub. No.: WO2005/068808

PCT Pub. Date: Jul. 28, 2005

(65) Prior Publication Data

US 2008/0276915 A1    Nov. 13, 2008

(51) Int. Cl.
*F02D 11/10* (2006.01)
*F02M 25/07* (2006.01)
*F02B 47/08* (2006.01)
*G06F 19/00* (2006.01)

(52) U.S. Cl. .................. 123/399; 123/568.14; 701/108

(58) Field of Classification Search .................. 123/361, 123/396, 399, 400, 403, 90.15–90.18, 316, 123/568.11, 568.14, 568.21, 347, 348, 305; 701/101–103, 108, 110, 115

See application file for complete search history.

(56) References Cited

U.S. PATENT DOCUMENTS 4,759,321 A * 7/1988 Matsumoto et al. ...... 123/90.15

(Continued)

FOREIGN PATENT DOCUMENTS

EP       0 896 141 A2    10/1999

(Continued)

OTHER PUBLICATIONS

International Search Report mailed May 10, 2005 of International Application PCT/JP2005/001032.

(Continued)

*Primary Examiner*—Willis R Wolfe, Jr.
(74) *Attorney, Agent, or Firm*—Westerman, Hattori, Daniels & Adrian, LLP.

(57) ABSTRACT

An internal combustion engine includes a throttle controlling mechanism; a valve characteristic varying mechanism which controls an internal EGR rate by the control of an overlap period Pa and a non-overlap period Pb; and an output setting means which sets a required amount of engine output. The throttle controlling mechanism controls an opening degree of a throttle valve to fully open the throttle valve at a predetermined load Da with an increase in an operating amount D in a first load range Fa which covers load range below the predetermined load Da in a low-load range, and to keeps the throttle valve fully opened in a second load range Fb which covers a load range over the predetermined load Da. The valve characteristic varying mechanism controls the engine output by controlling the overlap period Pa or the non-overlap period Pb according to the required amount D over the entire load range, and controls valve operation characteristics to obtain a maximum internal EGR rate at the predetermined load Da.

20 Claims, 17 Drawing Sheets

U.S. PATENT DOCUMENTS

| | | | |
|---|---|---|---|
| 4,920,932 A * | 5/1990 | Schlunke | 123/73 C |
| 6,055,968 A | 5/2000 | Sasaki et al. | |
| 6,192,858 B1 * | 2/2001 | Nieberding | 123/568.14 |
| 6,508,229 B2 * | 1/2003 | Miyakubo et al. | 123/90.15 |
| 6,850,836 B1 * | 2/2005 | Scholl et al. | 701/115 |
| 6,882,929 B2 * | 4/2005 | Liang et al. | 701/115 |
| 7,367,313 B2 * | 5/2008 | Chang et al. | 123/568.14 |
| 7,370,633 B2 * | 5/2008 | Kang et al. | 123/568.14 |
| 2006/0201479 A1 * | 9/2006 | Brachert et al. | 123/305 |

FOREIGN PATENT DOCUMENTS

| | | |
|---|---|---|
| JP | 57-20528 | 2/1982 |
| JP | 61-198536 | 12/1986 |
| JP | 11-107861 | 4/1999 |
| JP | 11-117777 A | 4/1999 |
| JP | 2000-73803 | 3/2000 |
| JP | 2002-70597 | 3/2002 |

OTHER PUBLICATIONS

Translation of the International Preliminary Report on Patentability of International Application No. PCT/JP 2005/001032, with Form PCT/IB/373 and Form PCT/ISA/237.

Argentine Office Action dated Jun. 23, 2008, issued in corresponding Argentine Patent Application No. P 050100191.

* cited by examiner

CONTROL METHOD AND CONTROL APPARATUS OF INTERNAL COMBUSTION ENGINE

TECHNICAL FIELD

The present invention relates to a control method and a control apparatus of an internal combustion engine comprising a throttle controlling mechanism which opens or closes a throttle valve which controls an amount of intake air; and a valve operation device having a valve characteristic varying mechanism which controls valve operation characteristics including opening/closing timing of intake and exhaust valves.

BACKGROUND ART

In the field of internal combustion engine, various technologies for improving the fuel efficiency by decreasing the pumping loss are known. For example, an internal combustion engine disclosed in JP-A-2002-070597 comprises an intake operating angle changing mechanism for changing the operating angle of an intake valve; and a phase changing mechanism for changing the center phase of the operating angle of intake and exhaust valves. Also, in an middle-load range of the internal combustion engine, the decrease in the pumping loss, and the improvement in the fuel efficiency, and the improvement in the exhaust gas purification performance are sought by setting up the predetermined amount of a minus overlap period (a non-overlap period) at the middle-load range of the internal combustion engine and by leaving a combusted gas in a combustion chamber (namely, an internal EGR <Exhaust G as Recirculation>). Further, when the load is shifted from the middle-load range to an extremely low-load range of the engine, the stability of combustion is improved in the extremely low-load range such as an idle state, etc. by advancing the opening timing of the intake valve to the intake top dead center and retarding the closing timing of the exhaust valve to the intake top dead center in order to eliminate the minus overlap period.

In addition, an internal combustion engine disclosed in JP-A-11-117777 comprises a variable valve mechanism control means for controlling a variable valve mechanism including intake and exhaust valves; and a throttle valve for controlling the amount of intake air according to the depressed amount of an accelerator. Also, when the internal combustion engine is in the low-load or middle-load range, the pumping loss is decreased by controlling the throttle valve to be almost fully opened regardless of the depressed amount of the accelerator, and the amount of intake air is controlled by controlling the closing timing and the lift amount of the intake valve.

The internal combustion engine disclosed in JP-A-2002-070597 decreases the pumping loss by the internal EGR, but it does not consider to decrease the pumping loss by throttling intake air by a throttle valve. Also, the internal combustion engine disclosed in JP-A-11-117777 decreases the pumping loss by quickly closing the intake valve, but does not consider to decrease the pumping loss by controlling the amount of burned gas left in the combustion chamber due to the internal EGR.

Further, during warming-up of an internal combustion engine whose temperature is low, its combustibility is lower than that of the engine which is already warmed up since the temperature in the combustion chamber is also low and thus the evaporated status of fuel is poor. Therefore, if the internal EGR rate is high, the combustion becomes more unstable such that an accidental fire could easily occur. Moreover, because the internal EGR is performed to lower the maximum combustion temperature, the warming-up of the internal combustion engine is not promoted.

DISCLOSURE OF THE INVENTION

The present invention has been made in consideration of the above situations. It is an object of the present invention to improve the fuel efficiency and the exhaust gas purification performance while reducing the pumping loss in a low-load range or a low and middle-load ranges. It is also an object of the present invention to improve the combustion stability during warming-up stage of an internal combustion engine and to facilitate the warming-up of the internal combustion engine. Further, it is also an object of the present invention to improve the fuel efficiency and the exhaust gas purification performance in the vicinity of a predetermined load in a low range or a low and middle-load ranges and to secure the necessary engine output in a high load range. Moreover, it is also an object of the present invention to decrease the pumping loss in the first load range. Furthermore, it is also an object of the present invention to improve the degree of precision of engine output control by the internal EGR rate across a wide range.

As a first aspect of the present invention, there is provided a method of controlling an internal combustion engine. The internal combustion engine comprises: a throttle controlling mechanism which controls an opening degree (a throttle position) of a throttle valve which controls an amount of intake air; a valve characteristic varying mechanism which controls valve characteristics including a closing timing of an exhaust valve; and an output setting means which sets a required amount of engine output. The valve characteristic varying mechanism changes the closing timing of the exhaust valve to control overlap and non-overlap periods, thereby controlling an internal EGR rate. The internal combustion engine is controlled in the following control mode.

The throttle controlling mechanism controls the throttle position, in a first load range of the internal combustion engine which covers from an no-load to a predetermined load in a low-load range or in an middle-load range, so that the throttle valve becomes opened from an idle opening degree to a full opening degree or an almost full opening degree at the predetermined load in accordance with an increase of the required amount, and that the throttle valve is opened to the full opening degree or the almost full opening degree in a second load range of the internal combustion engine which covers a load range over the predetermined load, and the valve characteristic varying mechanism controls the engine output by controlling the overlap and non-overlap periods according to the required amount in the entire load range of the internal combustion engine and controls the non-overlap period to obtain a maximum internal EGR rate from a maximum non-overlap period at the predetermined load.

Accordingly, the throttle valve is fully or almost fully opened in the first load range which covers from zero to the predetermined load in a low-load range or a middle-load range, and is controlled to be fully or almost fully opened in the second load range. Thus, the pumping loss further decreases over the entire load range, especially in the low-load range or the middle-load range. On the other hand, the valve characteristic varying mechanism controls the engine output at the internal EGR rate by the control of overlap and non-overlap periods to obtain engine output according to the required amount over the entire load range. Thus, the pumping loss decreases and the amount of generation of NOx decreases, and further the internal EGR rate becomes the maximum at the predetermined load. Thus, the pumping loss and the amount of generation of NOx remarkably decrease in the low-load range or the middle-load range in the vicinity of the predetermined load.

As a second aspect of the present invention, in the method of controlling an internal combustion engine of the first aspect, during warming-up of the internal combustion engine, the throttle controlling mechanism controls the opening degree of the throttle valve to increase its opening degree with the increase in the required amount over the entire load range, and the valve characteristic varying mechanism controls the valve operation characteristics so as not to form the non-overlap period over the entire load range, and after the warming-up of the internal combustion engine, the control in the control mode is performed.

Accordingly, during warming-up of an engine, fresh air is controlled in flow rate according to the required amount by the throttle valve and supplied to the combustion chamber. On the other hand, since the valve characteristic varying mechanism prevents the forming of the non-overlap period, the internal EGR rate becomes smaller than that when a non-overlap period is formed. Thus, the combustibility improves and the combustion temperature also increases. In addition, after the warming-up of an engine, the pumping loss and the amount of generation of NOx decrease similarly to the first aspect of the present invention.

As a third aspect of the present invention, there is provided a method of controlling an internal combustion engine. The internal combustion engine comprises: a throttle controlling mechanism which controls an opening degree of a throttle valve which controls an amount of intake air; a valve characteristic varying mechanism which controls valve characteristics including a closing timing of an exhaust valve; and an output setting means which sets a required amount of engine output. The valve characteristic varying mechanism controls the valve operation characteristics to control the internal EGR rate. The internal combustion engine is controlled in the following control mode.

The throttle controlling mechanism controls the throttle position, in a first load range of the internal combustion engine which covers from an no-load to a predetermined load in a low-load range or in an middle-load range, so that the throttle valve becomes opened from an idle opening degree to a full opening degree or an almost full opening degree at the predetermined load in accordance with an increase of the required amount, and that the throttle valve is opened to the full opening degree or the almost full opening degree in a second load range of the internal combustion engine which covers a load range over the predetermined load, and the valve characteristic varying mechanism controls the internal EGR rate and the engine output by controlling the valve operation characteristic in accordance with the required amount over the entire load range of the internal combustion engine, and controls the valve operation characteristics to get the maximum internal EGR rate at the predetermined load.

Accordingly, the pumping loss decreases substantially similarly to the first aspect of the present invention. On the other hand, the valve characteristic varying mechanism controls engine output at an internal EGR rate by the control of the valve operation characteristic over the entire load range. Thus, the pumping loss and the amount of generation of NOx decrease, and further the internal EGR rate becomes the maximum at the predetermined load. Thus, the pumping loss decrease substantially in a low-load range or an middle-load range in the vicinity of the predetermined load.

As a fourth aspect of the present invention, in the method of controlling an internal combustion engine according to the third aspect, during the warming-up of the internal combustion engine, the throttle controlling mechanism controls the opening degree of the throttle valve to increase its opening degree with the increase in the required amount over the entire load range, and the valve characteristic varying mechanism controls the valve operation characteristic to make the internal EGR rate the minimum or almost the minimum over the entire load range, and after the warming-up of the internal combustion engine, the control in the control mode is performed.

Accordingly, during warming-up of an engine, fresh air is controlled in flow rate according to the required amount by the throttle valve and supplied to the combustion chamber. On the other hand, the valve characteristic varying mechanism controls the internal EGR rate to be the minimum or almost the minimum in the control range of internal EGR rate. Thus, the combustibility improves and the combustion temperature increases. Also, after the warming-up, the pumping loss and the amount of generation of NOx decrease similarly to the first aspect of the invention.

As a fifth aspect of the present invention, in the methods of controlling an internal combustion engine according to any one of the first and fourth aspects, in the control mode, the valve characteristic varying mechanism controls the valve operation characteristic to increase the internal EGR rate with the increase in the required amount in the first load range, and controls the valve operation characteristic to decrease the internal EGR rate with the increase in the required amount in the second load range.

Accordingly, in the first load range, the internal EGR rate increases to restrain the inflow of fresh air to the combustion chamber caused by the large opening degree of the throttle valve. Thus, the pumping loss decreases by the increase in internal EGR rate, and the amount of generation of NOx decreases. Also, in the second load range, the non-overlap period decreases with the increase in the required amount, and thereby the internal EGR rate decreases and the amount of fresh air supplied to the combustion chamber increases. Thus, the internal EGR rate increases gradually as the load approaches the predetermined load. As a result, the pumping loss and the amount of generation of NOx also decrease, so that a large engine output can be obtained in a high load range.

As a sixth aspect of the present invention, in the method of controlling an internal combustion engine according to any one of the first and fifth aspects, the valve operation characteristic includes a maximum lift amount of the intake valve, and the valve characteristic varying mechanism controls the valve operation characteristic to decrease the maximum lift amount of the intake valve with an decrease in the overlap period, an increase in the non-overlap period or an increase in the internal EGR rate.

Accordingly, when the overlap period is long, when the non-overlap period is short, or when the internal EGR rate is small, the maximum lift amount of the intake valve is large. Thus, the pumping loss decreases. Further, in the vicinity of the predetermined load, when the overlap period is short, when the non-overlap period is long, or when the internal EGR rate is large, the pumping loss decreases as the internal EGR rate is large.

As a seventh aspect of the present invention, the method of controlling an internal combustion engine according to the sixth aspect, the valve characteristic varying mechanism controls the valve operation characteristic to make an effective overlap period and an effective non-overlap period zero or almost zero at a maximum overlap period or a minimum internal EGR rate.

Accordingly, in the control range of the internal EGR rate, the outflow of the burned gas from the combustion chamber substantially stops, and the control of the internal EGR rate begins on the basis of the time when the inflow of fresh air to the combustion chamber substantially begins. Thus, the control precision degree of the internal EGR rate becomes high, and the expansion of its control range is possible.

BRIEF DESCRIPTION OF THE DRAWINGS

FIGS. 4(A) to 4(D) are graphs showing control modes for controlling the internal combustion engine shown in FIG. 1, wherein FIG. 4(A) illustrates a throttle opening degree map during warming-up, FIG. 4(B) illustrates a throttle opening degree map after warming-up, FIG. 4(C) illustrates control modes for an overlap period and a non-overlap period during warming-up, and FIG. 4(D) illustrates control patterns for an overlap period and a non-overlap period after warming-up.

Figure 1:
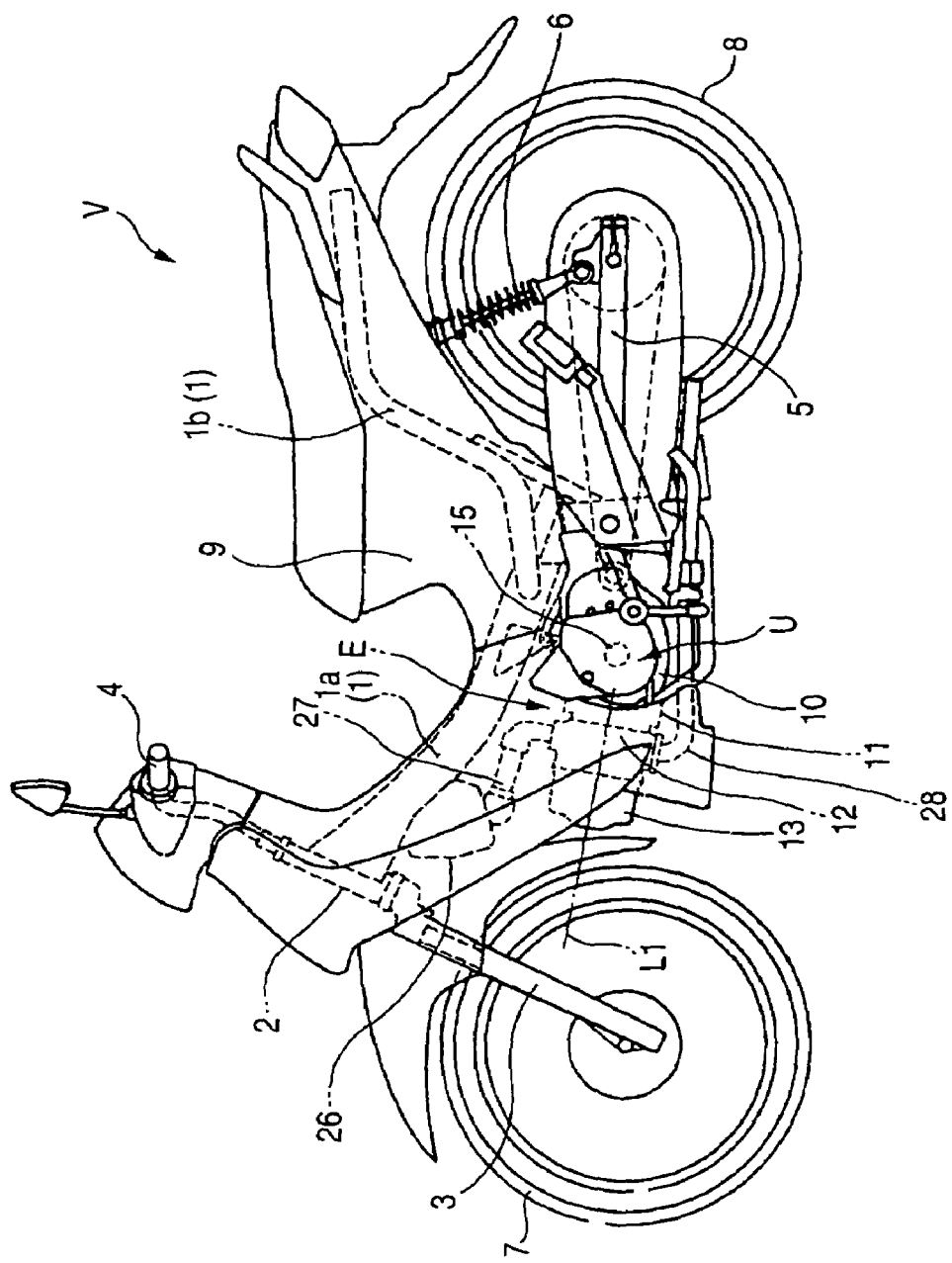
FIG. 1 is a schematic right side view of a motorcycle which is equipped with an internal combustion engine according to the present invention.

Note, reference numerals in the drawings denote the follows:

1 . . . BODY FRAME, 2 . . . HEAD PIPE, 3 . . . FRONT FORK, 4 . . . HANDLE, 5 . . . SWING ARM, 6 . . . REAR CUSHION, 7 . . . FRONT WHEEL, 8 . . . REAR WHEEL, 9 . . . BODY COVER, 10 . . . CRANKCASE, 11 . . . CYLINDER, 12 . . . CYLINDERHEAD, 13 . . . HEADCOVER, 14 . . . PISTON, 15 . . . CRANKSHAFT, 16 . . . COMBUSTION CHAMBER, 17 . . . INTAKE PORT, 18 . . . EXHAUST PORT, 19 . . . IGNITION PLUG, $20i$, $20e$ . . . VALVE GUIDE, 21 . . . VALVE SPRING, 22 . . . INTAKE VALVE, 23 . . . EXHAUST VALVE, 24 . . . VALVE SEAT, 25 . . . VALVE SYSTEM CHAMBER, 26 . . . AIR CLEANER, 27 . . . THROTTLE BODY, 28 . . . EXHAUST PIPE, 29 . . . CAMSHAFT HOLDER, 30 . . . THROTTLE VALVE, 32 . . . THROTTLE OPENING DEGREE DETECTING MEANS, 33 . . . ELECTRIC MOTOR, 34, 35 . . . GEAR, 40 . . . VALVE OPERATION DEVICE, 41, 42 . . . MAIN ROCKER ARM, 43 . . . ROCKER SHAFT, 44 . . . BEARING, 50 . . . CAMSHAFT, 51, 52 . . . DRIVING CAM, 53 . . . INTAKE CAM, 54 . . . EXHAUST CAM, 55 . . . PRESSING SPRING, 56 . . . BEARING, 57 . . . CAM SPROCKET, 59 . . . POWER TRANSMITTING CHAMBER, 60E, 60I . . . HOLDER, $61e$, $61i$, $62e$, $62i$ . . . PLATE, 63E, 63I . . . COLLAR, 64 . . . RIVET, $66e$, $66i$ . . . SUB-ROCKER ARM, $67e$, $67i$ . . . CONNECTING LINK, 68 . . . CONTROL SPRING, 69 . . . BEARING, 70 . . . CONTROL SHAFT, $71i$, $71e$ . . . CONTROL LINK, 72, 73 . . . CONNECTING PIN, 76, 77, 78, 79 . . . SPRING HOLDING PORTION, $76a$, $77a$, $78a$, $79a$ . . . SPRING GUIDE, 80 . . . ELECTRIC MOTOR, 80B . . . OUTPUT SHAFT, 81 . . . REDUCTION GEAR, 82 . . . OUTPUT GEAR, 83 . . . COVER, 84 . . . SUPPORTING SHAFT, 88 . . . HOLDING TUBE, 89 . . . BEARING, 90 . . . GUIDING SHAFT, 91 . . . THROUGH-HOLE, 92 . . . ECU, 94 . . . ROCKING POSITION DETECTING MEANS, 95 . . . REQUIRED OUTPUT AMOUNT DETECTING MEANS, 96 . . . ENGINE TEMPERATURE DETECTING MEANS, E . . . INTERNAL COMBUSTION ENGINE, V . . . MOTORCYCLE, U . . . POWER UNIT, L1 . . . CYLINDER AXIS, L2 . . . ROTATIONAL CENTER LINE, $L3i$, $L3e$ . . . ROCKING CENTER LINE, $L4i$, $L4e$, $L5i$, $L5e$ . . . PIVOTAL CENTER LINE, L6 . . . CENTRAL AXIS, A1 . . . AXIAL DIRECTION OF CYLINDER, A2 . . . AXIAL DIRECTION OF CAMSHAFT, T . . . THROTTLE CONTROL MECHANISM, D . . . OPERATING AMOUNT, Da . . . PREDETERMINED LOAD, Db . . . MAXIMUM LOAD, Fa, Fb . . . LOAD RANGE, E . . . DEVIATION, M . . . VALVE CHARACTERISTIC VARYING MECHANISM, $M1i$, $M1e$ . . . LINK MECHANISM, M2 . . . DRIVING MECHANISM, M3 . . . CONTROLLING MECHANISM, M4 . . . TRANSMITTING MECHANISM, H0 . . . REFERENCE PLANE, H1, H2 . . . ORTHOGONAL PLANE, R1 . . . ROTATION DIRECTION, R2 . . . REVERSE ROTATION DIRECTION, Kimax, Kemax . . . MAXIMUM VALVE OPERATION CHARACTERISTIC, Kimin, Kemin . . . MINIMUM VALVE OPERATION CHARACTERISTIC, β . . . OPENING DEGREE, θiomax, θicmin, θeomax, θecmin . . . MOST ADVANCED ANGLE POSITION, θicmax, θiomin, θecmax, θeomin . . . MOST RETARDED ANGLE POSITION, Pa . . . OVERLAP PERIOD, Pb . . . NON-OVERLAP PERIOD, Pae . . . EFFECTIVE OVERLAP PERIOD, Pbe . . . EFFECTIVE NON-OVERLAP PERIOD, N . . . INTERNAL EGR RATE, Nn . . . MINIMUM INTERNAL EGR RATE, Nx . . . MAXIMUM INTERNAL EGR RATE

BEST MODE FOR CARRYING OUT THE INVENTION

Hereinafter, preferred embodiments of the present invention will be described with reference to FIGS. 1 to 14(B).

Referring to FIG. 1, an internal combustion engine E to which the present invention is applied is mounted on a motorcycle V as a vehicle. The motorcycle V comprises a body frame 1 having a front frame 1a and a rear frame 1b; a handle 4 fixed to an upper end of a front fork 3 which is rotatably supported by a head pipe 2 combined with a front end of the front frame 1a; a front wheel 7 rotatably supported by a lower end of the front fork 3; a power unit U supported by the body frame 1; a rear wheel 8 rotatably supported by a rear end of a swing arm 5 which is swingably supported by the body frame 1; a rear cushion 6 connecting the rear frame 1b with a rear portion of the swing arm 5; and a body cover 9 which covers the body frame 1.

The power unit U comprises an internal combustion engine E which has a crankshaft 15 extending to the right and left of the motorcycle V and which is horizontally arranged; and a power transmission which comprises a speed change gear and transmits the power of the internal combustion engine E to the rear wheel 8. The internal combustion engine E comprises a crankcase 10 which forms a crank chamber for accommodating a crankshaft 15 and also serves as a speed change gear case; a cylinder 11 which is combined with the crankcase 10 and extends forward; a cylinder head 12 combined with a front end of the cylinder 11; and a head cover 13 combined with a front end of the cylinder head 12. A cylinder axis L1 of the cylinder 11 extends forward with a little upward inclination (see FIG. 1) or parallel to the horizontal direction. Also, the rotation of the crankshaft 15 rotatably driven by the piston 14 (see FIG. 2) is speed-changed by the speed change gear and transmitted to the rear wheel 8, and finally, the rear wheel 8 is driven.

Figure 2:
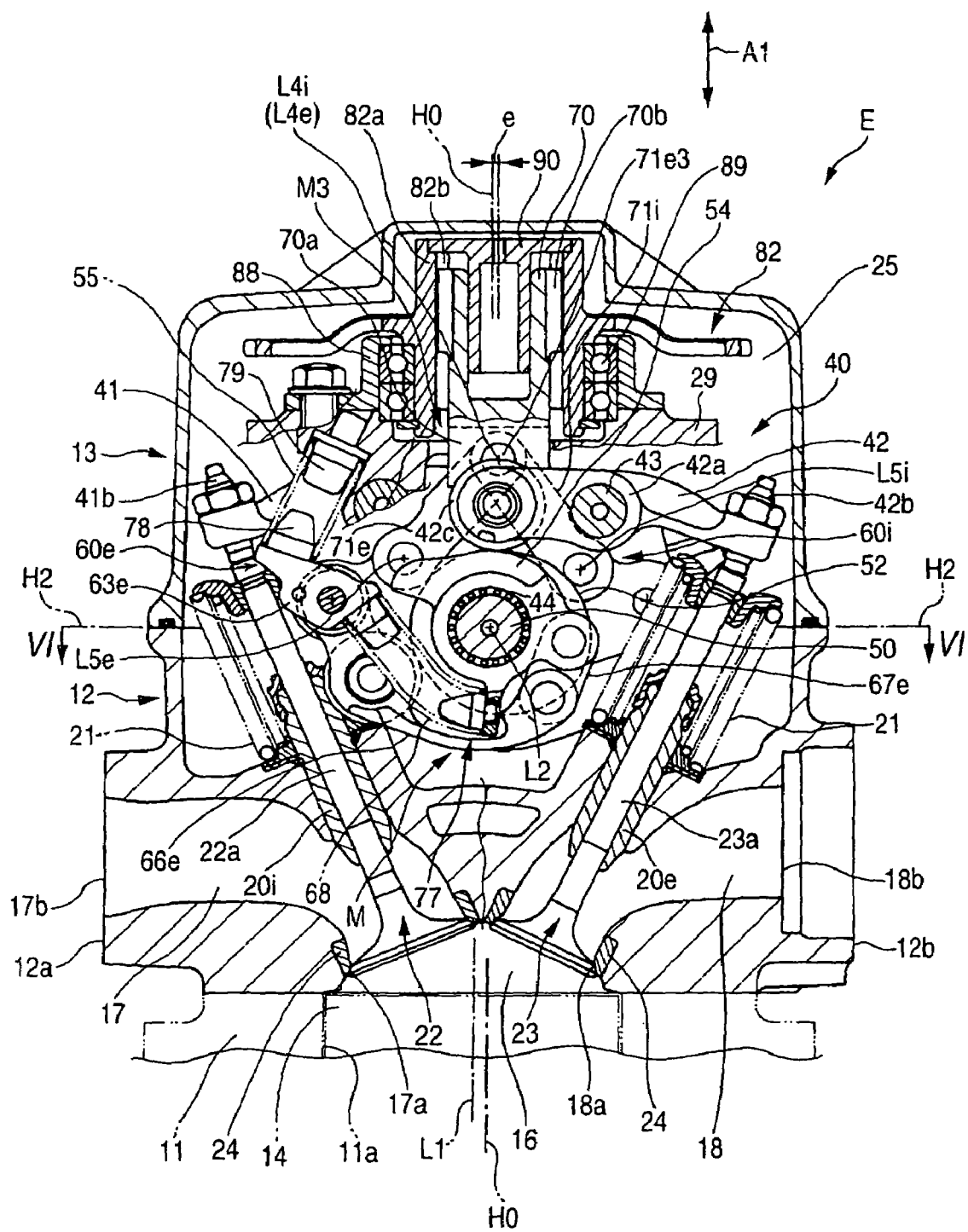
FIG. 2 is a cross-sectional view taken along the arrows II-II of FIG. 6 in the internal combustion engine shown in FIG. 1, which passes through center lines of valve stems of an intake valve and an exhaust valve and a center line of a control shaft.

Referring also to FIG. 2, the internal combustion engine E is an SOHC and air-cooled type single-cylinder 4-stroke internal combustion engine. The cylinder 11 is formed with a cylinder bore 11a into which the piston 14 is reciprocably fitted, and a combustion chamber 16 is formed on a surface of the cylinder head 12 facing the cylinder bore 11a in the axial direction A1 of the cylinder. The cylinder head 12 is also formed with an intake port 17 having an intake opening 17a and an exhaust port 18 having an exhaust opening 18a, which are respectively opened to the combustion chamber 16. An ignition plug 19 facing the combustion chamber 16 is inserted into a mounting hole 12c formed in the cylinder head 12 so as to be mounted to the cylinder head 12. Here, the combustion chamber 16 constitutes a combustion space along with the cylinder bore 11a in a space between the piston 14 and the cylinder head 12.

In addition, the cylinder head 12 is provided with an intake valve 22 and an exhaust valve 23 which are engine valves that are reciprocably supported by valve guides 20i, 20e and that are always biased in a valve closing direction by valve springs 21. The intake valve 22 and the exhaust valve 23 are operated to be opened or closed by a valve operation device 40 provided in the internal combustion engine E, and opens or closes the intake opening 17a and the exhaust opening 18a formed in the valve seats 24. The valve operation device 40 except for an electric motor 80 (see FIG. 5) is placed in a valve system chamber 25 formed by the cylinder head 12 and the head cover 13.

In order to conduct the air taken in from the outside to the intake port 17, an intake system comprising an air cleaner 26 (see FIG. 1) and a throttle body 27 (see FIG. 1) is mounted on a top face 12a that is one side of the cylinder head 12 to which the inlet 17b of the intake port 17 is opened. An exhaust system comprising an exhaust pipe 28 (see FIG. 1) which conducts the exhaust gas flowing out from the combustion chamber 16 through the exhaust port 18 to the outside the internal combustion engine E is mounted on a bottom face 12b of the cylinder head 12 to which the outlet 18b of the exhaust port 18 is opened. Further, the intake system is provide with a fuel injection valve that is a fuel supply system which supplies liquid fuel to the intake air.

Also, the air sucked in through the air cleaner 26 and the throttle body 27 is sucked into the combustion chamber 16 through the intake valve 22 which opens in the intake stroke in which the piston 14 move down from the intake port 17, and the sucked air is compressed in a state which is mixed with fuel in the compression stroke in which the piston 14 moves up. The fuel-air mixture is ignited by the ignition plug 19 and combusted at the final phase of the compression stroke, and the piston 14 driven by the pressure of the combusted gas in the expansion stroke in which the piston 14 move down drives the crankshaft 15 to rotate. The burned gas is discharged to the exhaust port 18 through the exhaust valve 23 which opens in the exhaust stroke in which the piston 14 moves up from the combustion chamber 16.

Figure 3:
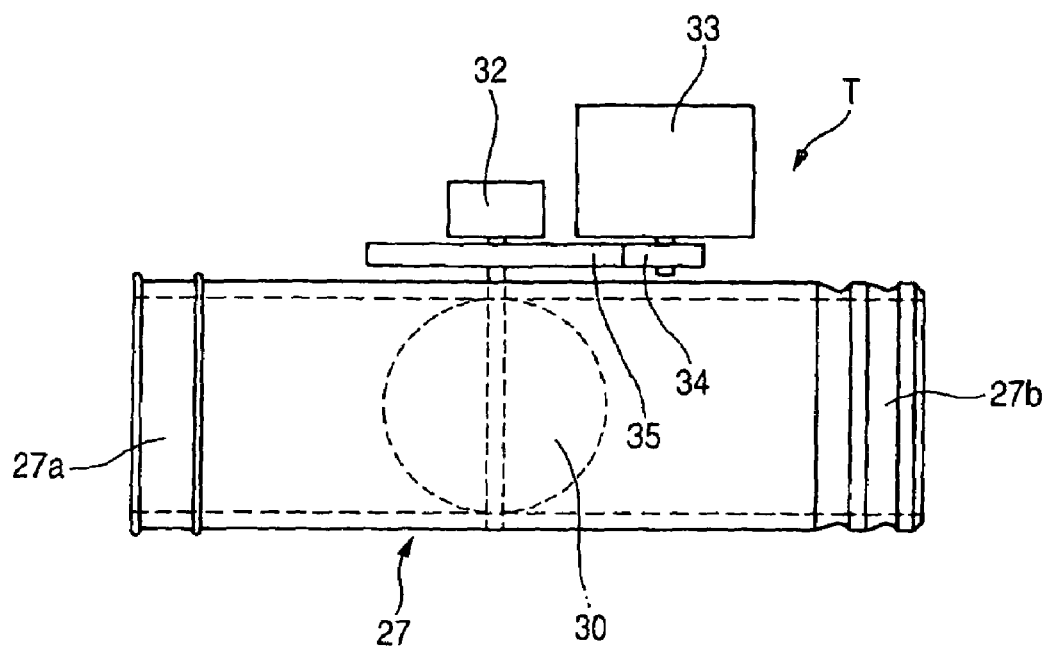
FIG. 3 is a schematic view illustrating a throttle body of the internal combustion engine shown in FIG. 1.
Figure 4:
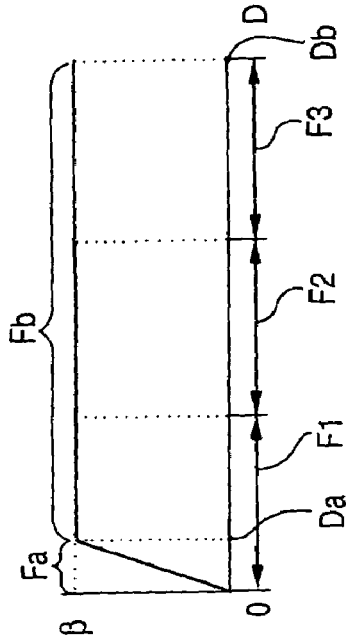
Figure 4:
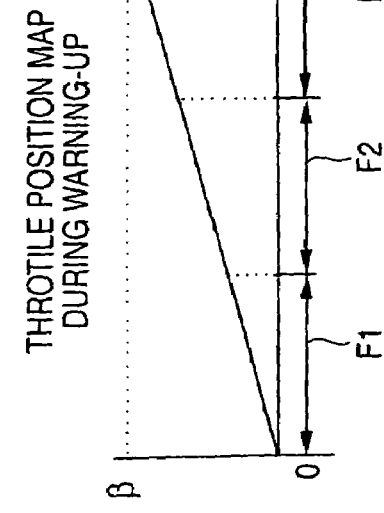
Figure 4:
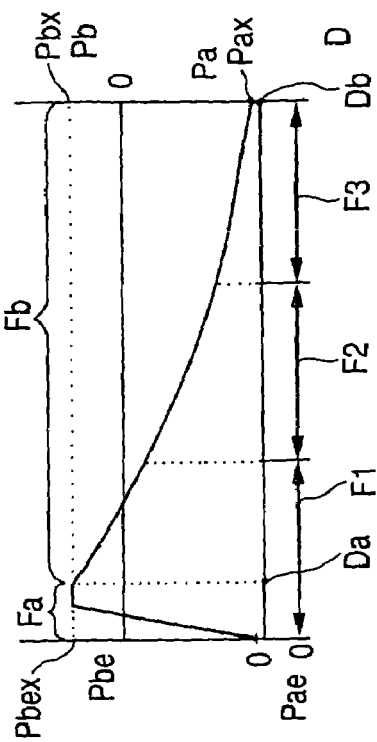
Figure 4:
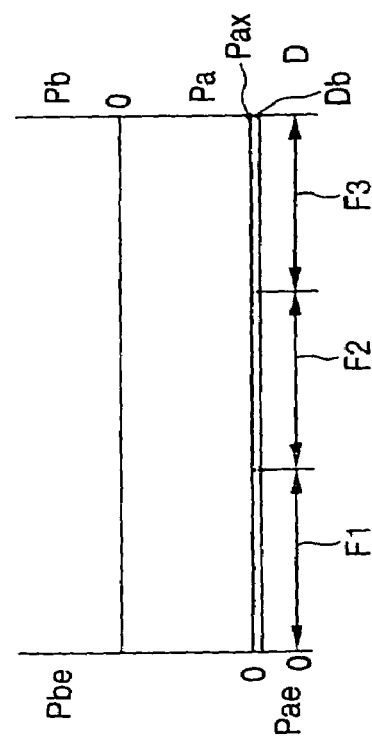

Referring to FIG. 3, a throttle valve 30 which is biased in a valve closing direction by return springs; a throttle controlling mechanism T which controls the opening degree (throttle position) of the throttle valve by the opening or closing of the throttle valve 30; and a throttle opening degree detecting means which detects the opening degree of the throttle valve 30 are provided in the throttle body 27 communicating with the air cleaner 26 at an upstream end 27a and communicating with the intake port 17 through the intake pipe at an downstream end 27b. The throttle controlling mechanism T comprises an electric motor 33 as an actuator which is controlled by an electronic control unit (herein after referred to as ECU) 92 (see FIG. 5) as a control system; and a reduction gear train composed of a series of gears 34 and 35 which constitutes a power transmitting mechanism which transmits a driving force of the electric motor 33 to the throttle valve 30.

Figure 5:
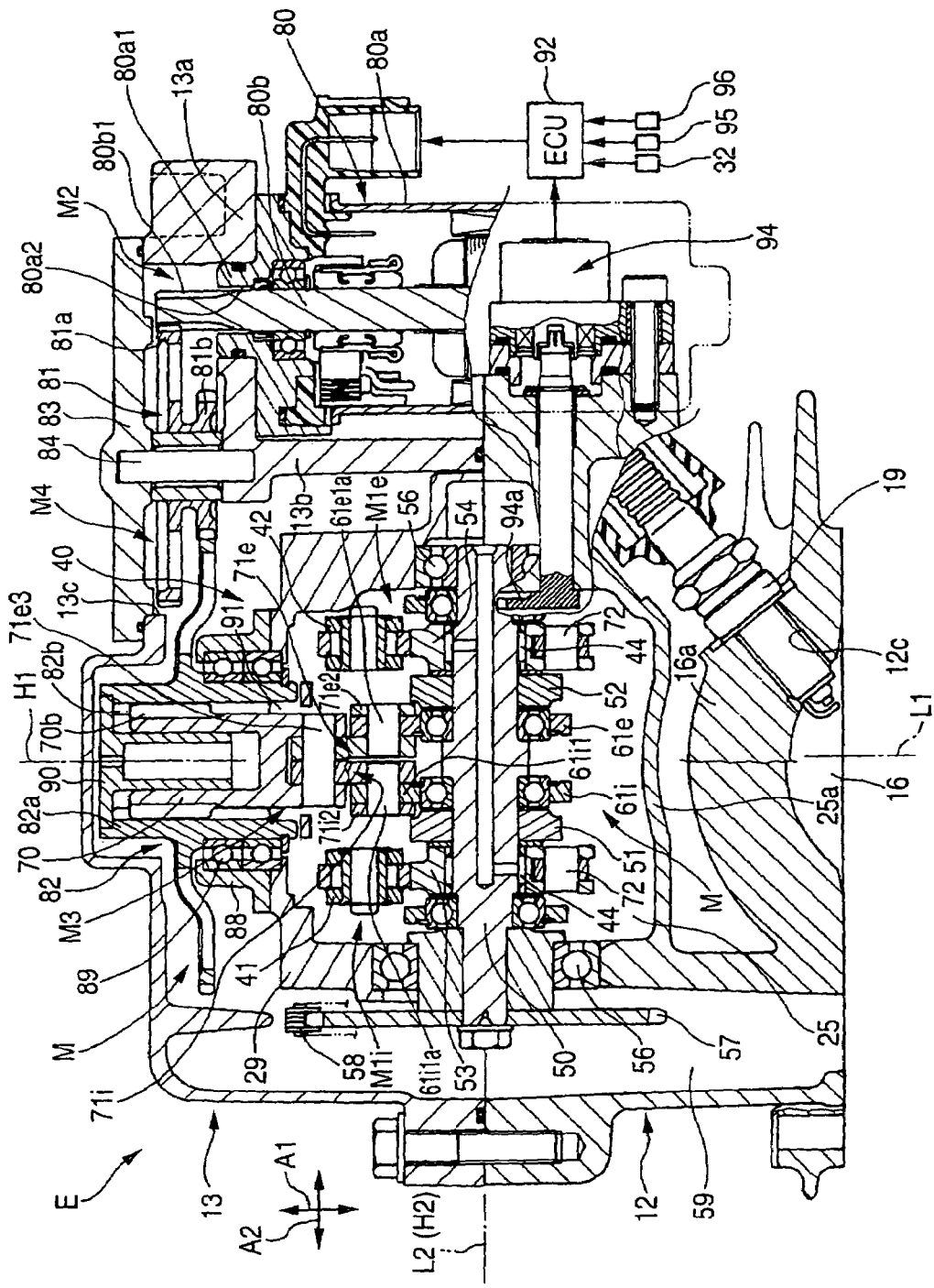
FIG. 5 is a schematic cross-sectional view taken along the arrows Va-Va and partially along the arrows Vb-Vb of FIG. 10, illustrating the internal combustion engine shown in FIG. 1.

Referring to FIG. 5, ECU 92 comprises a required output amount detecting means 95 which detects the operating amount D of a throttle grip as an output operating member manipulated by an operator; an engine temperature detecting means 96 which detects the warming-up state of the internal combustion engine E (for example, a lubricating oil temperature detecting means); and a throttle opening degree detecting means 32 (throttle position sensor 32). Each detection signal from the operating state detecting means which detects the operating state of the internal combustion engine E is input to ECU 92. Here, the operating amount D is a required amount of engine output set by an operator, and the throttle grip is an output setting means (output setting mechanism) which sets the required amount.

Throttle opening degree maps in which an opening degree β of the throttle valve 30 is set with the operating amount D as a parameter is stored in a storage unit of ECU 92. These throttle opening degree maps is composed of a map for the time of warming-up which is used during warming-up of the internal combustion engine E and a map for the time of post warming-up which is used after warming-up of the internal combustion engine E is completed. Also, an electric motor 33 opens or closes the throttle valve 30 by the control of ECU 92 which allows the opening degree of the throttle valve 30 to be the opening degree β set by the throttle opening degree map according to the operating amount D detected by the required output amount detecting means 95 and the actual opening degree of the throttle valve 30 detected by the throttle opening degree detecting means 32.

When the engine temperature detecting means 96 detects that the engine temperature is that of the warming-up which is below the predetermined temperature, ECU 92 selects the map for the time of the warming-up. When the engine temperature detecting means 96 detects that the engine temperature is that of the post warming-up which is over the predetermined temperature, ECU 92 selects the map for the time of the post warming-up. On the basis of the map for the time of the warming-up, a opening degree characteristic (a throttle position characteristic) of the throttle valve 30 is set which is directly proportional to the operating amount D so that the opening degree of the throttle valve 30 increases with the increase in the operating amount D over the entire load range of the internal combustion engine E. For this reason, the electric motor 33 controls the opening degree of the throttle valve 30 to increase the opening degree with the increase in the operating amount D, i.e., the engine load detected by the required output amount detecting means 95 which also functions as a load detecting means which detects engine load over the entire load range.

On the other hand, on the basis of the map for the post warming-up, the opening degree characteristic is set as follows: in a first load range Fa which covers the load range from a no-load to a predetermined load Da in a low-load range, the opening degree of the throttle valve 30 increase from an idle opening degree to a full opening degree in which the valve fully open at the predetermined load Da with the increase in the operating amount D (engine load), and in a second load range Fb which covers the load range Da over the predetermined load, the throttle valve 30 opens in the full opening degree regardless of the operating amount D. For this reason, the electric motor 33 controls the opening degree of the throttle valve 30 to fully open the throttle valve 30 at the predetermined load Da from the idle opening degree with the increase in the operating amount D in the first load range Fa, and to keep the throttle valve 30 fully open in the second load range Fb. Here, the entire load range between the no-load and the maximum load Db is divided into three ranges such as a low-load range F1, a middle-load range F2 and a high load range F3.

Referring to FIGS. 2, 5 to 7, 12(A) and 12(B), a valve operation device 40 comprises an intake main rocker arm 41 which functions as an intake cam follower abutting a valve stem 22a to open or close the intake valve 22; an exhaust main rocker arm 42 which functions as an exhaust cam follower abutting a valve stem 23a to open or close the exhaust valve 23; and a valve characteristic varying mechanism M which controls a valve operation characteristic including the opening and closing timing of the intake valve 22 and the exhaust valve 23 and the maximum lift amount.

The intake main rocker arm 41 and the exhaust main rocker arm 42 are rockably supported by a pair of rocker shafts 43 which is fixed to a camshaft holder 29 at the supporting points 41a and 42a of the center part, and abut the valve stem 22a and 23a at adjusting screws 41b and 42b which constitute operating parts of one end, and come in contact with the intake cam 53 and the exhaust cam 54 at rollers 41c and 42c which constitute contacting portions of the other end.

The valve characteristic varying mechanism M comprises an internal mechanism which is accommodated in the valve system chamber 25; and an electric motor 80, an external mechanism which is arranged outside the valve system chamber 25 and an electric actuator which drives the internal mechanism. The internal mechanism comprises a camshaft 50 which is rotatably supported by the cylinder head 12 and rotationally driven while interlocking with the crankshaft 15; an intake driving cam 51 and an exhaust driving cam 52 which function as a driving cam which is provided on the camshaft 50 and rotates integrally with the camshaft 50; link mechanisms M1i and M1e which function as an interlocking mechanism which is pivotally supported by the camshaft 50 and is rockable about the camshaft 50; an intake cam 53 and an exhaust cam 54 which function as a valve operating cam which is connected to the link mechanisms M1i and M1e and is pivotally supported by the camshaft 50 to operate the intake main rocker arm 41 and the exhaust main rocker arm 42; a driving mechanism M2 comprising the electric motor 80 as a driving source to rock the link mechanisms M1i and M1e about the camshaft 50 (see FIG. 5); a controlling mechanism M3 which is disposed between the driving mechanism M2 and the link mechanisms M1i and M1e, and controls the rocking of the link mechanisms M1i and M1e about the camshaft 50 according to the driving force of the electric motor 80; and a pressing spring 55 which functions as a pressing and biasing means which exerts a torque about the camshaft 50 to the link mechanisms M1i and M1e to push the link mechanisms M1i and M1e against the controlling mechanism M3.

Figure 6:
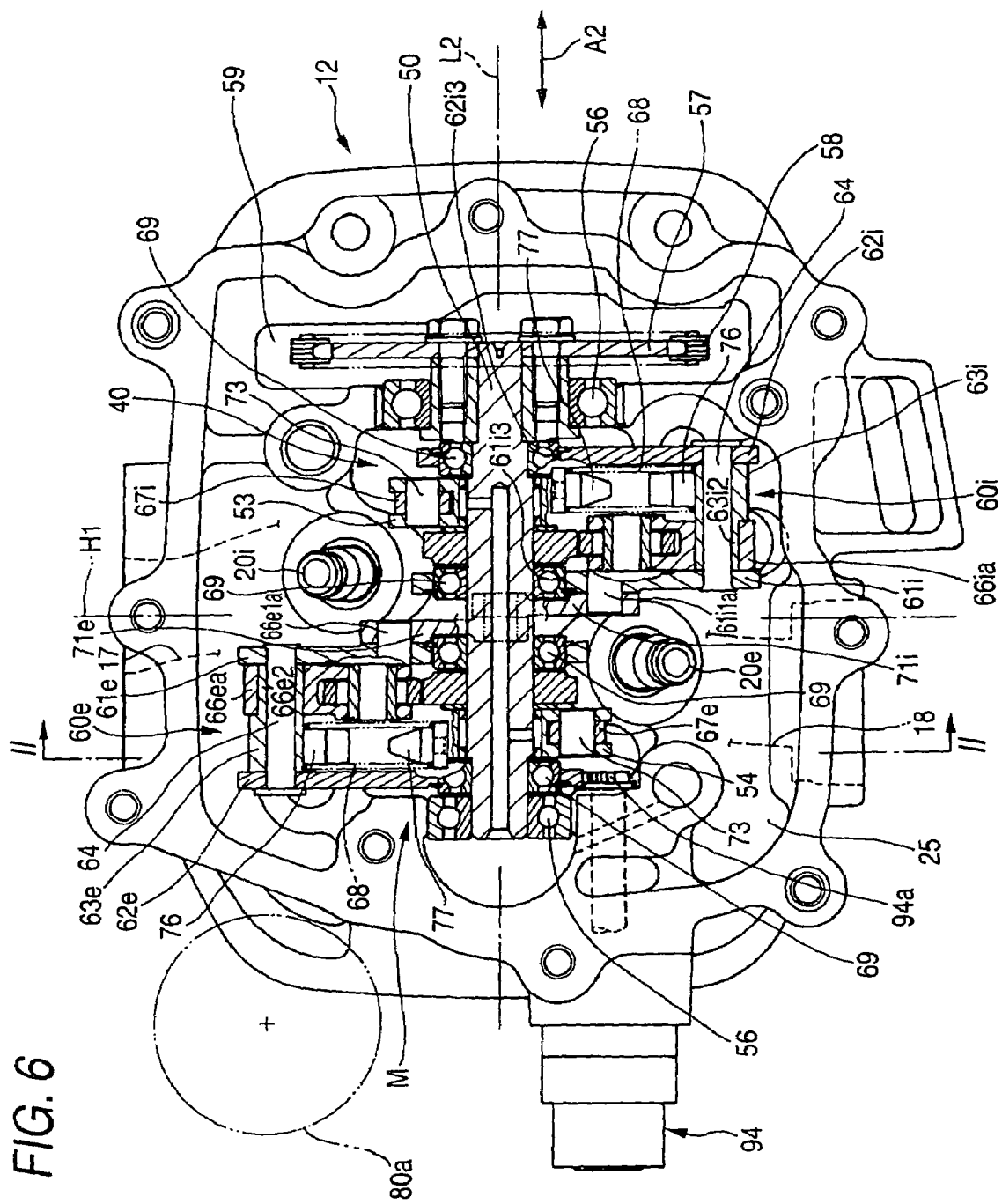
FIG. 6 is a schematic cross-sectional view taken along the arrows VI-VI of FIG. 2, partially illustrating component members of a valve operation device in the internal combustion engine shown in FIG. 1, with a head cover removed.

Referring to FIGS. 2, 5 and 6, the camshaft 50 is rotatably supported by the cylinder head 12 and the camshaft holder 29 combined with the cylinder head 12 through a pair of bearings 56 which is arranged at both ends of the camshaft 50, and is operated together with the crankshaft and is rotationally driven at half of the revolution speed of the crankshaft 15 while interlocking therewith it by the power of the crankshaft 15 (see FIG. 1) transmitted through the power transmitting mechanism for operating the valve. The power transmitting mechanism for valve-operating comprises a cam sprocket 57 integrally combined with a front end of a left end of the camshaft 50 that is one end thereof; a driving sprocket integrally combined with the crankshaft 15; and a timing chain 58 which crosses the cam sprocket 57 and the driving sprocket. The power transmitting mechanism for valve-operating is accommodated in the power transmitting chamber which is formed by the cylinder 11 and the cylinder head 12 and is located at the left side of the cylinder 11 and the cylinder head 12 that is one side to a first orthogonal plane H1. Also, the power transmitting chamber 59 formed on the cylinder head 12 among the power transmitting chamber adjoins the valve system chamber 25 in the diametrical direction from the cylinder axis L1 (herein after referred to as a diametrical direction) and in an axial direction A2 of a rotational center line L2 of the camshaft 50 (herein after referred to as an axial direction A2 of a camshaft). Here, the first orthogonal plane H1 is a plane which includes the cylinder axis L1 and crosses a reference plane H0 as described later at right angle.

In addition, in the valve characteristic varying mechanism M, members relating to the intake valve 22 and the exhaust valve 23 includes members corresponding to each other, and the intake driving cam 51, the exhaust driving cam 52, the link mechanisms M1i and M1e, the intake cam 53 and the exhaust cam 54 has the same basic structure. Therefore, the following description will be made of the members relating to the exhaust valve 23 and the description on the members relating to the intake valve 22 and the matters concerned will be written in parentheses as necessary.

Referring to FIGS. 2, 5, 8(A), 8(B), 9(A) to 9(D), 12(A) and 12(B), the exhaust driving cam 52 (the intake driving cam 51) which is press-fitted into and fixed to the camshaft 50 has a cam surface formed over its entire circumferential surface. This cam surface consists of a base circle portion 52a (51a) which does not rock the exhaust cam 54 (the intake cam 53) through the link mechanism M1e (M1i) and a cam swelled portion 52b (51b) which rocks the exhaust cam 54 (the intake cam 53) through the link mechanism M1e (M1i). The base circle portion 52a (51b) has a sectional shape of a circular arc with a predetermined radius from the rotational center line L2, and the cam swelled portion 52b (51b) has a sectional shape in which the radius from the rotational center line L2 increases and then decreases in the direction of the rotation direction R1 of the camshaft 50. Also, the base circle portion 52a (51a) sets a rocking position of the exhaust cam 54 (the intake cam 53) so that the exhaust main rocker arm 42 (the intake main rocker arm 41) comes in contact with the base circle portion 54a (53a) of the exhaust cam 54 (the intake cam 53), and the cam swelled portion 52b (51b) sets a rocking position of the exhaust cam 54 (the intake cam 53) so that the exhaust main rocker arm 42 (the intake main rocker arm 41) comes in contact with the base circle portion 54a (53a) of the exhaust cam 54 (the intake cam 53) and the cam swelled portion 54b (53b).

The link mechanisms M1i and M1e comprise the intake link mechanism M1i linked to the intake cam 53; and the exhaust link mechanism M1e linked to the exhaust cam 54. Referring to FIGS. 5 and 6, the exhaust link mechanism M1e (the intake link mechanism M1i) comprises a holder 60e (60i) which is pivotally supported by the camshaft 50 and rockable about the camshaft 50; an exhaust sub-rocker arm 66e (an intake sub-rocker arm 66i) which is pivotally supported by the holder 60e (60i) and is driven by the exhaust driving cam 52 (the intake driving cam 51) to be rockable; a connecting link 67e (67i) whose one end is pivotally mounted to the exhaust sub-rocker arm 66e (the intake sub-rocker arm 66i) and whose other end is pivotally mounted to the exhaust cam 54 (the intake cam 53); and a control spring 68 which pushes the exhaust sub-rocker arm 66e (the intake sub-rocker arm 66i) against the exhaust driving cam 52 (the intake driving cam 51).

Figure 8A:
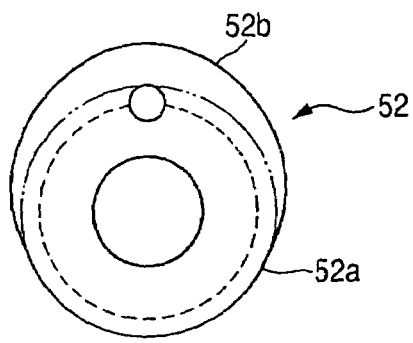
FIG. 8(A) is a view taken by viewing an exhaust driving cam of a valve characteristic varying mechanism in an axial direction of the camshaft and FIG. 8(B) is a view illustrating an exhaust link mechanism and an exhaust cam of the valve characteristic varying mechanism which are pivotally operated, in the valve operation device of the internal combustion engine shown in FIG. 1.
Figure 8B:
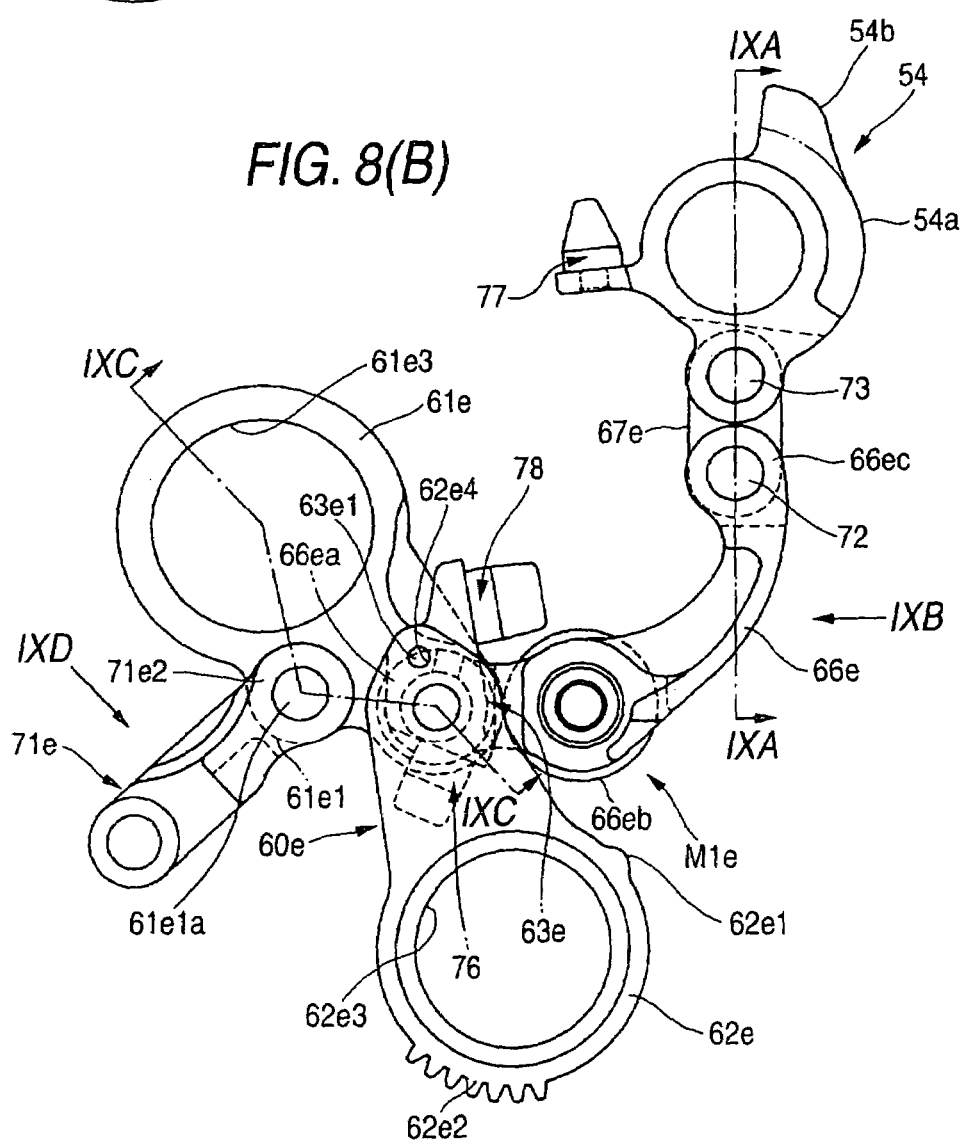
Figure 9:
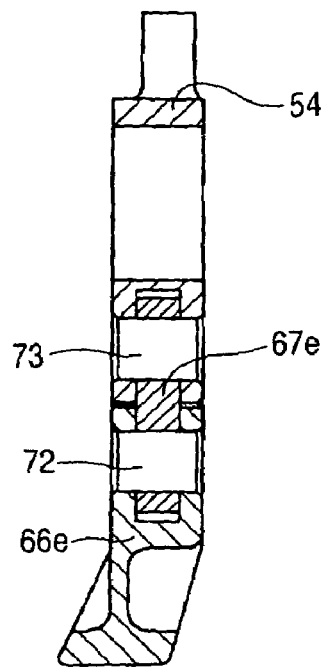
FIG. 9(A) is a cross-sectional view taken along the arrows IXA-IXA of FIG. 8(B)
FIG. 9(B) is a view taken along the arrow IXB of FIG. 8(B)
FIG. 9(C) is a cross-sectional view taken along the arrow IXC of FIG. 8(B)
FIG. 9(D) is a view taken along the arrow IXD of FIG. 8(B).
Figure 9:
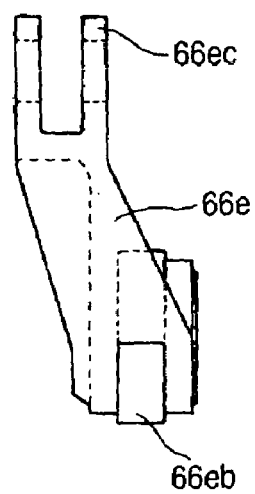
Figure 9:
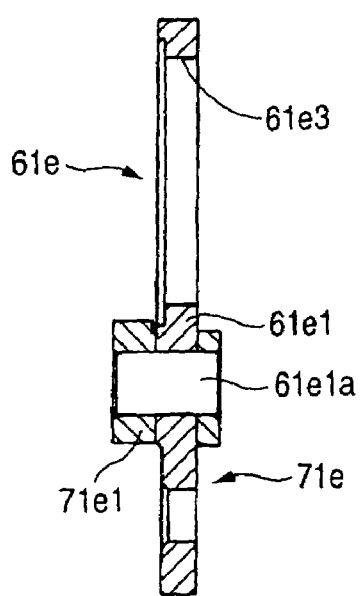
Figure 9:
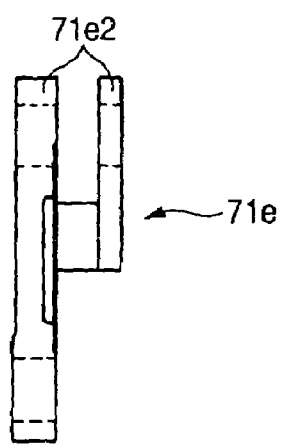

The holder 60e (60i) supported by the camshaft 50 through a bearing 69 into which the camshaft 50 is inserted comprises a pair of first and second plates 61e and 62e (61i and 62i) spaced in the axial direction A2 of the camshaft and a connecting member which connects the first and the second plates 61e and 62e (61i and 62i) to each other in the axial direction A2 of the camshaft with a predetermined space left and pivotally supports the exhaust sub-rocker arm 66e (the intake sub-rocker arm 66i). Also, this connecting member comprises a collar 63e (63i) which defines the predetermined space between the both plates 61e and 62e (61i and 62i) and functions as a supporting shaft which pivotally supports the exhaust sub-rocker arm 66e (the intake sub-rocker arm 66i); and a rivet 64 which is inserted into the collar 63e (63i) and combines both plates 61e and 62e (61i and 62i) together. As shown in FIGS. 6, 8(A) and 8(B), mounting holes 61e3 and 62e3 (61i3 and 62i3) in which the bearings 69 which rockably support the respective plates 61e and 62e (61i and 62i) by the camshaft 50 are formed in the respective plates.

Referring to FIG. 5, the exhaust control link 71e (the intake control link 71i) of the controlling mechanism M3 is pivotally mounted to the first plate 61e (61i), and the exhaust control link 71e (the intake control link 71i) and the first plate 61e (61i) are connected to each other in such a the way that both can move relative to each other at connecting parts 71e2 and 61e1 (71i2 and 61i1) there between. More specifically, a connecting pin 61e1a (61i1a) which is press-fitted into and fixed to a hole of the connecting part 61e1 (61i1) of the first plate 61e (61i) which functions as a connecting part on the holder side is inserted into the connecting part 71e2 (71i2) of the exhaust control link 71e (the intake control link 71i) which functions as a connecting member on the controlling mechanism side in such a way that the both can move relative to each other.

Also, on the second plate 62e (62i), a decompression cam 62e1 (62i1)(see FIGS. 8(A), 8(B), 12(A), and 12(B)) for facilitating the starting by slightly opening the intake valve 22 and the exhaust valve 23 in the compression stroke and thus lowering the compression pressure at the starting of the internal combustion engine E is formed. In addition, on the second plate 62e, a detected part 62e2 detected by a detecting part 94a of a rocking position detecting means 94 (see FIGS. 14(A) and 14(B)) is provided. The detected part 62e2 consists of a toothed part which meshes a toothed part constituting the detecting part 94a to engage in the rocking direction of the second plate 62e. In addition, even though not used in the present embodiment, the second plate 61i is also provided with a part 62i2 corresponding to the detected part 62e2.

On the collar 63e (63i), a first spring holding portion 76 which holds one end of the control spring 68 including a compression coil spring and a movable-side holding portion 78 which holds one end of the pressing spring 55 including a compression coil spring are integrally formed and provided. Both spring holding portions 76, 78 are arranged to adjoin the supporting point 66ea (66ia) of the exhaust sub-rocker arm 66e (the intake sub-rocker arm 66i) in the axial direction A2 of the camshaft and arranged in the circumferential direction of the collar 63e (63i) with a space left (see FIG. 6).

In addition, on the collar 63e (63i), a convex part 63e1 (63i1) which is fitted into a hole 62e4 (62i4) formed in the second plate 62e (62i) is formed at a position away from a rocking center line L3e (L3i) of the exhaust sub-rocker arm 66e (the intake sub-rocker arm 66i). The convex part 63e1 (63i1) and the hole 62e4 (62i4) constitute an engaging part which prevents relative rotation about the rocking center line L3e (L3i) which is located between the second plate 62e (62i) and the collar 63e (63i). This engaging part prevents the collar 63e (63i) to which the same direction of torque is exerted by the spring force of the control spring 68 and the pressing spring 55 from rotating relative to the first and second plates 61e and 62e (61i and 62i) due to the provision of the pair of spring holding portions 76 and 78. Therefore, the operation that the pressing spring 55 applies the torque about the camshaft 50 to the link mechanisms M1i and M1e and the operation that the control spring 68 pushes against the exhaust driving cam 52 (the intake driving cam 51) are surely performed.

Referring to FIGS. 2, 5, 6, 8(A), 8(B), 9(A) to 9(C), 12(A), and 12(B), the exhaust sub-rocker arm 66e (the intake sub-rocker arm 66i) which is arranged between the first and the second plates 61e and 62e (61i and 62i) along with the exhaust cam 54 (the intake cam 53) and the exhaust driving cam 52 (the intake driving cam 51) comes in contact with the exhaust driving cam 52 (the intake driving cam 51) at a roller 66eb (66ib) which functions as a contacting part which comes in contact with the exhaust driving cam 52 (the intake driving cam 51) in the axial direction A2 of the camshaft, and is rockably supported by the supporting point 66ea (66ia) at its one end, and is fixed to the connecting pin 72 which is fixed to one end of the connecting link 67e (67i) at the connecting part 66ec (66ic) at its other end. For this reason, the exhaust sub-rocker arm 66e rocks about the collar 63e (63i) as a pivot center because the exhaust driving cam 52 (the intake driving cam 51) rotates along with the camshaft 50.

The exhaust cam 54 (the intake cam 53) pivotally supported by the connecting pin 73 which is fixed to the other end of the connecting link 67e (67i) is composed of rocking cams which are supported by the camshaft 50 through the bearing 44 and thus can rock about the camshaft 50. A cam surface is formed on a part of the circumferential surface of the exhaust cam. This cam surface consists of the base circle portion 54a (53a) which keeps the exhaust valve 23 (the intake valve 22) closed; and the cam swelled portion 54b (53b) which pushes down and open the exhaust valve 23 (the intake valve 22). The base circle portion 54a (53a) has a sectional shape of a circular arc with a fixed radius from the rotational center line L2, and the cam swelled portion 54b (53b) has a sectional shape of a circular arc which is increased in its radius from the rotational center line L2 in the reverse rotation direction R2 (the rotation direction R1) of the camshaft 50. For this reason, the cam swelled portion 54b (53b) of the exhaust valve 23 (intake valve 22) has a shape in which the lift amount of the exhaust cam 54 gradually increases in the reverse rotation direction R2 (the rotation direction R1).

The exhaust cam 54 (the intake cam 53) is rocked by the same amount about the camshaft 50 along with the exhaust link mechanism M1e (the intake link mechanism M1i) by the driving force of the driving mechanism M2 transmitted through the controlling mechanism M3, while it is rocked about the camshaft 50 along with the exhaust sub-rocker arm 66e (the intake sub-rocker arm 66i) which is rocked by the exhaust driving cam 52 (the intake driving cam 51). Moreover, the exhaust cam 54 (the intake cam 53) which rocks with respect to the camshaft 50 rocks the exhaust main rocker arm 42 (the intake main rocker arm 41), and opens or closes the exhaust valve 23 (the intake valve 22). For this reason, the exhaust cam 54 (the intake cam 53) is rocked by the driving force of the driving mechanism M2 which is sequentially transmitted through the holder 60e (60i), the exhaust sub-rocker arm 66e (the intake sub-rocker arm 66i) and the connecting link 67e (67i), and is rocked by the driving force of the exhaust driving cam 52 (the intake driving cam 51) which is sequentially transmitted through the exhaust sub-rocker arm 66e (the intake sub-rocker arm 66i) and the connecting link 67e (67i).

The control spring 68 which generates a spring force to push the rotor 66eb (66ib) of the exhaust sub-rocker arm 66e (the intake sub-rocker arm 66i) against the exhaust driving cam 52 (the intake driving cam 51) is arranged between the collar 63e (63i) and the exhaust cam 54, and can be expanded or contracted in the circumferential direction of the camshaft 50 according to the rocking of the exhaust sub-rocker arm 66e (the intake sub-rocker arm 66i). The other end of the control spring 68 having its one end held by the first spring holding portion 76 at the other end is held by the second spring holding portion 75 which is provided at a shelf-shaped protrusion integrally formed with the exhaust cam 54 (the intake cam 53).

The pressing spring 55 which always applies a spring force exerting torque in one direction of the rocking direction to the exhaust link mechanism M1e (the intake link mechanism M1i) has its one end held by the movable-side spring holding portion 78 of the holder 60e (60i), and has its other end held by the fixed-side spring holding portion 79 which is provided in the camshaft holder 29 which functions as a fixing member fixed to the cylinder head 12.

The spring force of the pressing spring 55 which pushes the exhaust link mechanism M1e (the intake link mechanism M1i) against the cylinder 11 side directly acts on the holder 60e (60i) and pushes them toward the direction facing the cylinder 11, and the torque from each spring force which acts on the holder 60e (60i) turns to the one direction. Moreover, the one direction is set to the same direction as that of the torque that acts on the exhaust cam 54 (the intake cam 53) by the reaction force acting on the exhaust cam 54 (the intake cam 53) from the exhaust valve 23 (the intake valve 22) when the exhaust cam 54 (the intake cam 53) opens the exhaust valve 23 (the intake valve 22). For this reason, the direction that the spring force of the pressing spring 55 always pushes the connecting part 61e1 (61i1) against the connecting part 71e2 (71i2) in the rocking direction is the same as the direction that the reaction force pushes the connecting part 61e1 (61i1) against the connecting part 71e2 (71i2) in the rocking direction on the basis of the torque that acts on the holder 60e (60i) from the exhaust cam 54 (the intake cam 53) through the connecting link 67e (67i) and the exhaust sub-rocker arm 66e (the intake sub-rocker arm 66i).

Furthermore, in the respective connecting parts 71e2 and 61e1 (71i2 and 61i1) between which a slight gap exists due to the pivotal mounting, the pressing spring 55 always pushes one connecting part 61e1 (61i1) against the other connecting part 71e2 (71i2) in the rocking direction. When the first plate is rocked by the exhaust control link 71e (exhaust control link 71i), the effect of the gap between the connecting part 71e2 (71i2) and the connecting part 61e1 (61i1) is removed and the movement of the exhaust control link 71e (the intake control link 71i) is accurately transmitted to the holder 60e (60i).

With reference to FIGS. 2, 5, 12(A) and 12(B), the controlling mechanism M3 comprises a cylindrical control shaft 70 which functions as a control member driven by the driving mechanism M2; and control links 71i and 71e which transmit the movement of the control shaft 70 to the link mechanisms M1i and M1e and rocks the link mechanisms M1i and M1e about the camshaft 50.

The control shaft 70 is movable in the direction parallel to the cylinder axis L1. Accordingly, the control shaft 70 includes the rotational center line L2 of the camshaft 50 and is movable in the direction parallel to the reference plane H0 parallel to the cylinder axis L1.

The control links 71i and 71e are composed of the intake control link 71i and the exhaust control link 71e. The intake control link 71i is pivotally mounted to the control shaft 70 by the connecting part 71i2 as a second intake connecting part and pivotally mounted to the connecting part 61i1 of the first plate 61i of the intake link mechanism M1i by the connecting part 71i1 as a first intake connecting part. The exhaust control link 71e is pivotally mounted to the control shaft 70 by the connecting part 71e1 as a first exhaust connecting part, and pivotally mounted to the connecting part 61e1 of the first plate 61e of the exhaust link mechanism M1e by the connecting part 71e2 as a second exhaust connecting part. The connecting part 71i1 of the intake control link 71i and the connecting part 70a of the control shaft 70 respectively have a hole into which a connecting pin 71e3 which is press-fitted into and fixed to the hole of the connecting part 71e1 of the exhaust control link 71e is inserted in such a manner to be relatively rotatable, and they are pivotally supported by the connecting pin 71e3. The bifurcated connecting parts 71i2 and 71e2 respectively have a hole into which the connecting pins 61i1a and 61e1a of the connecting parts 71i2 and 71e2 are inserted in such a manner to be relatively rotatable, and they are pivotally mounted to the connecting pins 61i1a and 61e1a. Also, in the respective connecting parts 71e1 (71i1) and 70a between which a slight gap exists due to the pivotal mounting, the connecting part 71e1 (71i1) is always pushed against the connecting part 70a. Therefore, the effect of the gap (play) between the connecting part 71e1 (71i1) and the connecting part 70a is removed and the movement of the exhaust control link 70 is transmitted to the exhaust control link 71e (the intake control link 71i) accurately.

Figure 7:
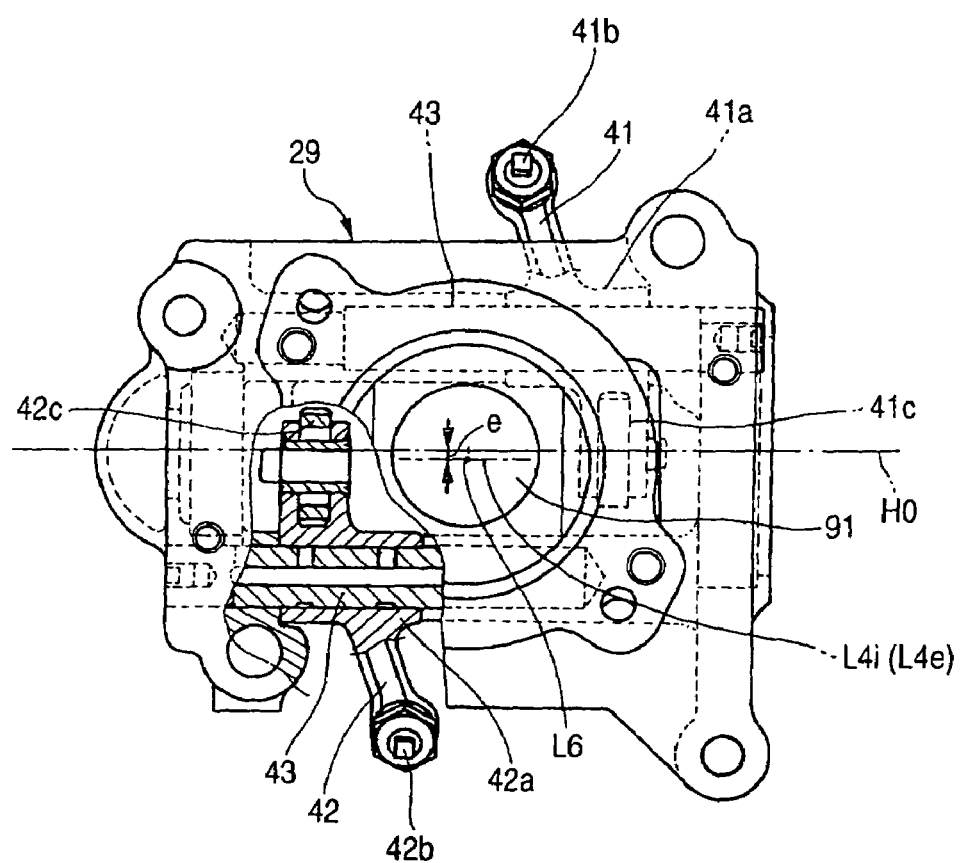
FIG. 7 is a view taken by viewing a camshaft holder mounted to a cylinder head, along a cylinder axis from the head cover in the internal combustion engine shown in FIG. 1.

Also, the pivotal center line L4i of the connecting part 71i1 (see FIGS. 2, 12(A) and 12(B)) and the pivotal center line L4e of the connecting part 71e1 (see FIGS. 2, 12(A), and 12(B)) constitute the common pivotal center line at the connecting part 70a of the control shaft 70, and are arranged parallel to the rotational center line L2 in a state deviated to the exhaust side which is one sidewith respect to the reference plane H0 by a predetermined deviation e (see FIGS. 2 and 7), and the pivotal center line L5i of the connecting part 71i2 (see FIGS. 2, 12(A), and 12(B)) is arranged parallel to the rotational center line L2 at the exhaust side. The pivotal center line L5e (see FIGS. 2, 12(A), and 12(B)) of the connecting part 71i2 is arranged parallel to the rotational center line L2 at the intake side that is the other side with respect to the reference plane H0. For this reason, as shown in FIG. 7, the central axis L6 of the control shaft 70 is parallel to the cylinder axis L1 and deviated to the exhaust side from the reference plane H0 by an deviation e. Here, the intake side means a side where the intake valve 22 is arranged with respect to the reference plane H0, and the exhaust side means a side where the exhaust valve 23 is arranged with respect to the reference plane H0.

Also, the length of the intake control link 71i which is the distance between both pivotal center lines L4i and L5i is set to be longer than the length of the exhaust control link 71e which is the distance between both pivotal center lines L4e and L5e. Both pivotal center lines L5i and L5e are arranged with the same distance from the rotational center line L2 on the same cylindrical surface from the rotational center line L2 about the camshaft 50, and is located at the side where the control shaft 70 and the pivotal center lines L4i and L4e are arranged with respect to the second orthogonal plane H2 which includes the rotational center line L2 and crosses the first orthogonal plane at right angle. Also, the pivotal center line L5i is located at a position nearer to the second orthogonal plane H2 than the pivotal center line L5e.

For this reason, the pivotal center lines L4i and L4e which are the common pivotal center line are deviated to the exhaust side from the reference plane H0 by an deviation e, or the link length of the intake control link 71i is set to be longer than that of the exhaust control link 71e. As a result, the rocking amount of the pivotal center line L5i about the camshaft 50, and thus the rocking amount of the intake link mechanism M1i and the intake cam 53 become larger than that of the exhaust link mechanism M1e and the exhaust cam 54 to the moving distance of the control shaft 70 driven by the driving mechanism M2.

Figure 10:
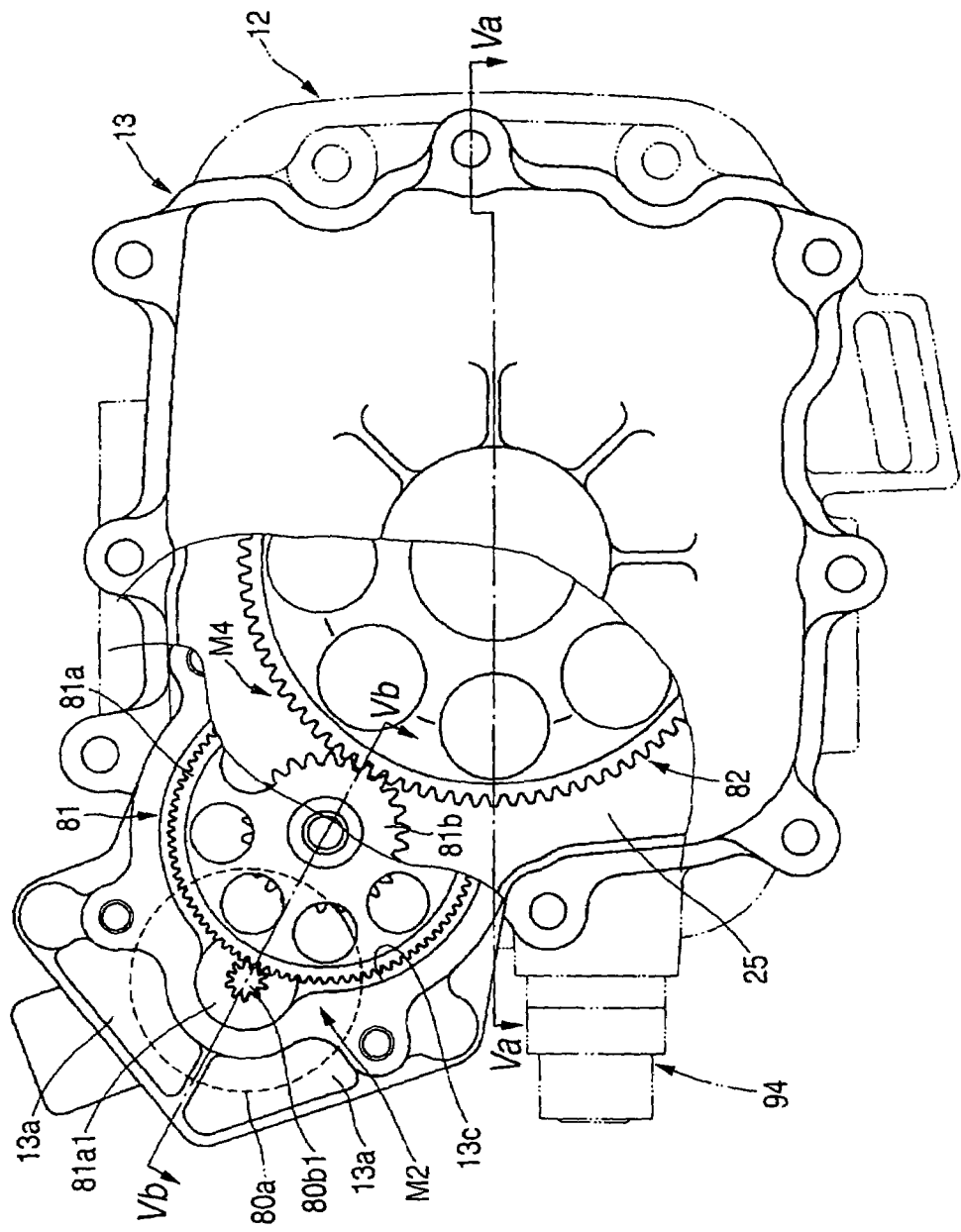
FIG. 10 is a view taken by viewing the head cover from the front along the cylinder axis in the internal combustion engine shown in FIG. 1, partially illustrating a driving mechanism of the valve characteristic varying mechanism.

Referring to FIGS. 6 and 10, the driving mechanism M2 which drives the control shaft 70 comprises the electric motor 80 which is mounted on the head cover 13 and can rotate reversibly; and a transmitting mechanism M4 which transmits the rotation of the electric motor 80 to the control shaft 70. Also, the controlling mechanism M3 and the driving mechanism M2 are arranged opposite to the cylinder 11 and the combustion chamber 16 with respect to the second orthogonal plane H2.

The electric motor 80 comprises a cylindrical main body 80a which accommodates a heat generating part such as a coil part and which has a central axis L1 parallel to the cylinder axis L1; and an output shaft 80b which extends parallel to the cylinder axis L1. The electric motor 80 is arranged outside the cylinder head 12 and the head cover 13 in the diametrical direction of the valve system chamber 25. Also, the power transmitting chamber 59 is arranged on the left side of the first orthogonal plane H1, and the main body 80a and the ignition plug 19 are arranged on the other side, i.e., the right side of the firth orthogonal plane H1. In the main body 80a, a through-hole 80a2 is formed in a mounted part 80a1 combined with a mounting part 13a which is formed on the head cover 13 to protrude in a shape of a visor in the diametrical direction, and the output shaft 80b passes through the through-hole 80a2 and protrudes to the outside of the main body 80a and extends to the inside of the valve system chamber 25. The main body 80a is located at a position where the entire main body is covered with the mounting part as seen in the axial direction A1 of cylinder from the head cover 13 side or from the front of the head cover 13 (see FIG. 10).

Referring to FIGS. 2, 5 and 10, in the valve system chamber 25, the transmitting mechanism M4 arranged between the camshaft holder 29 and the head cover 13 in the axial direction A1 of the cylinder consists of a reduction gear 81 which meshes with a driving gear 80b1 formed on an output shaft 80b which passes through the head cover 13 and extends into the valve system chamber 25; and an output gear 82 which meshes with the reduction gear 81 and is rotatably supported by the cylinder head 12 through the camshaft holder 29. The reduction gear 81 is rotatably supported by a supporting shaft 84 which is supported by the head cover 13 and a cover 83 which covers the opening 13c formed in the head cover 13, and comprises a large gear 81a which meshes with the driving gear 80b1; and a small gear 81b which meshes with the output gear 82. The output gear 82 comprises a cylindrical boss part 82a which is rotatably supported by a holding tube 88 combined with the camshaft holder 29 with bolts through a bearing 89.

The output gear 82 and the control shaft 70 are drivingly connected to a feed screw mechanism which functions as a motion converting mechanism that converts the rotational motion of the output gear 82 to the straight reciprocating motion of the control shaft 70 which is parallel to the cylinder axis L1. The feed screw mechanism comprises a female screw part 82b, such as a trapezoidal screw, formed on an inner circumferential surface of the boss part 82a; and a male screw part 70b, such as a trapezoidal screw, formed on an outer circumferential surface of the control shaft 70 and screwed to the female screw part 82b. The control shaft 70 is slidably fitted to the outer circumferential surface of the guide shaft 90 which is fixed to the boss part 82a can advance to or retreat from the camshaft 50 in the axial direction A1 of the cylinder through a through-hole 91 (see FIG. 7) formed on the camshaft holder 29 in a state in which it is guided by the guide shaft 90.

Referring to FIG. 5, the electric motor 80 is controlled by the electronic control unit (herein after referred to as ECU) 92. For this reason, detection signals from a starting detecting means which detects the starting timing of the internal combustion engine E constituting the operating state detecting means and an engine revolution speed detecting means which detects the engine revolution speed as well as the required output amount detecting means 95 and the engine temperature detecting means 96; and also detection signals from a rocking position detecting means of 94 (for example, composed of potentiometer) which detects a rocking position which is a rocking angle of the holder 60e of the exhaust link mechanism M1e which is rocked by the electric motor 80 and further the exhaust cam 54 with respect to the camshaft 50 are input to ECU 92

The storage unit of ECU 92 stores a valve control map in which the rocking position is set with the operating amount D as a parameter. Also, ECU 92 controls the electric motor 80 to be located at a the rocking position set by the valve control map according to the operating amount D detected by the required output amount detecting means 95, and the actual rocking position of the holder 69e of the exhaust link mechanism M1i which is detected by the rocking position detecting means, in other words, the actual rocking position of the exhaust cam 54. For this reason, if the position of the control shaft 70 which is driven by the electric motor 80 is changed, the rocking position which is the rotational position of the exhaust link mechanism M1e (the intake link mechanism M1i) and the exhaust cam 54 (the intake cam 53) relative to the camshaft 50 is changed according to the operating amount D, and the valve operation characteristic of the exhaust valve 23 (the intake valve 22) is controlled according to the operating state of the internal combustion engine E.

Figure 11:
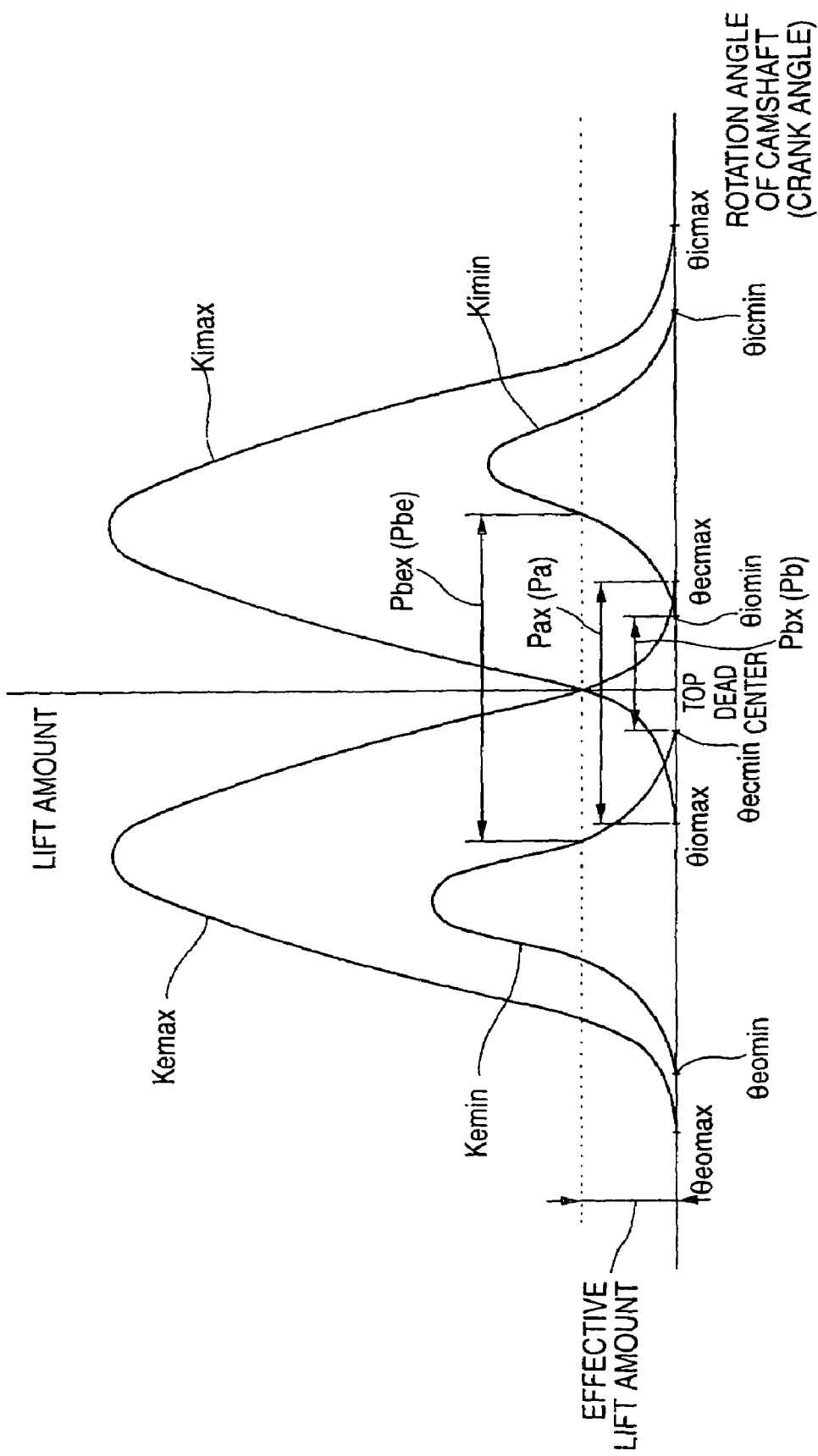
FIG. 11 is a graph for explaining valve operation characteristics of the intake valve and the exhaust valve by the valve operation device in the internal combustion engine shown in FIG. 1.
Figure 12:
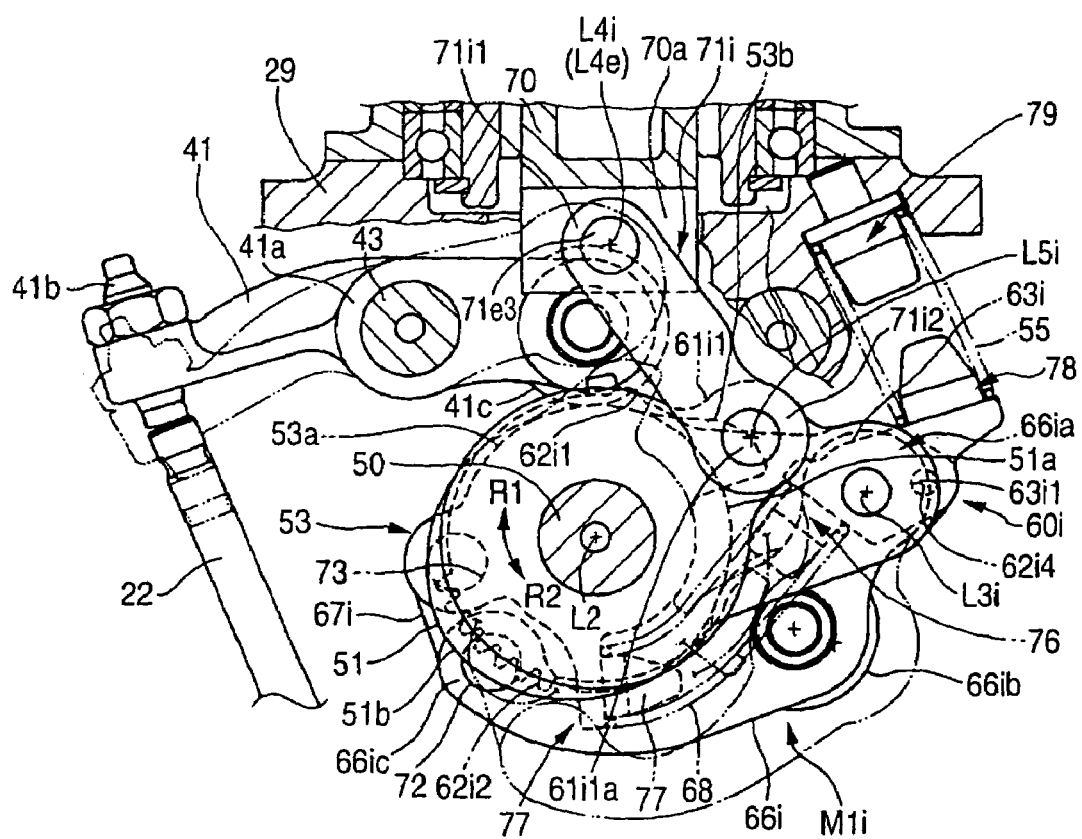
FIG. 12(A) is a view illustrating a main section of the valve characteristic varying mechanism when a maximum valve operation characteristic is obtained for the intake valve.
FIG. 12(B) is a view similar to a partial enlarged view of FIG. 2, illustrating the main section of the valve characteristic varying mechanism when a maximum valve operation characteristic is obtained for the exhaust valve, in the valve operation device of the internal combustion engine shown in FIG. 1.
Figure 12:
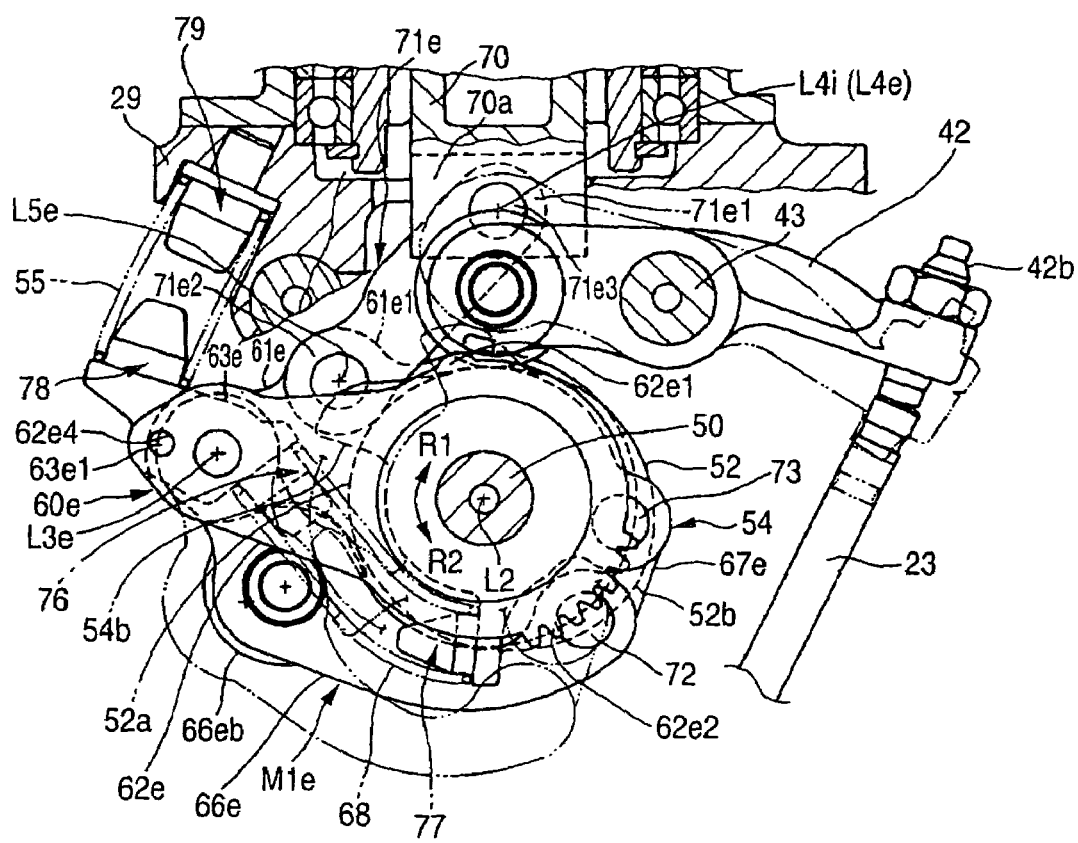
Figure 13:
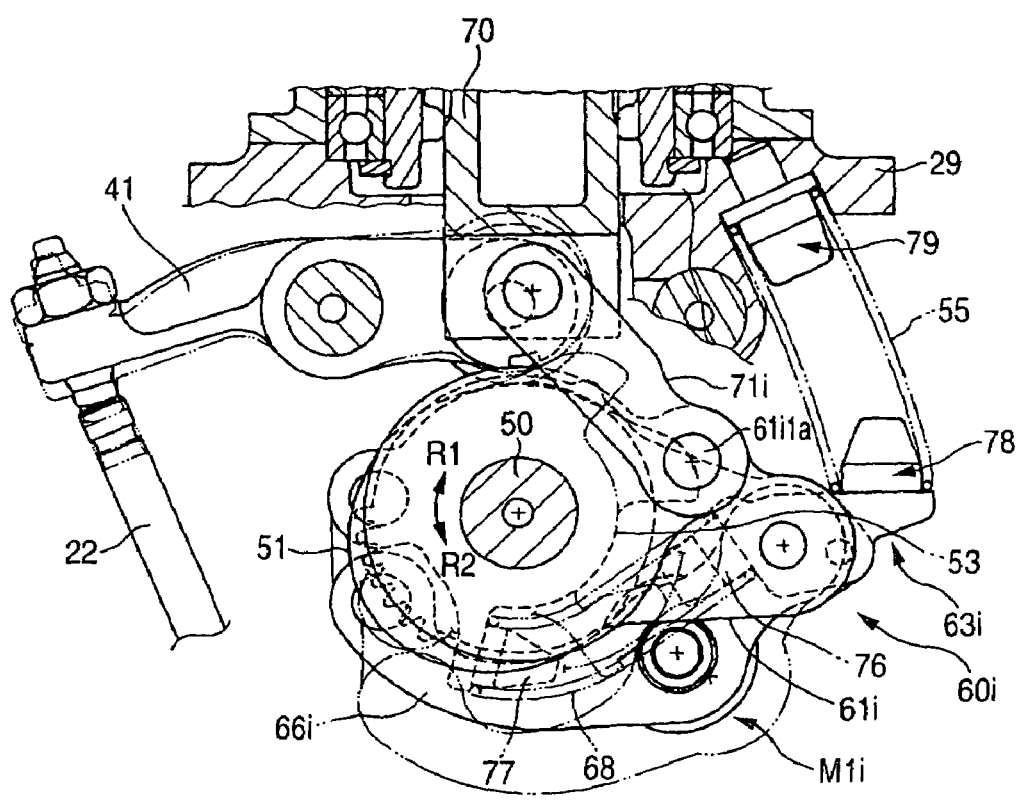
FIG. 13(A) is a view similar to FIG. 12(A) when a minimum valve operation characteristic is obtained for the intake valve.
FIG. 13(B) is a view similar to FIG. 12(B) when a minimum valve operation characteristic is obtained for the exhaust valve.
Figure 13:
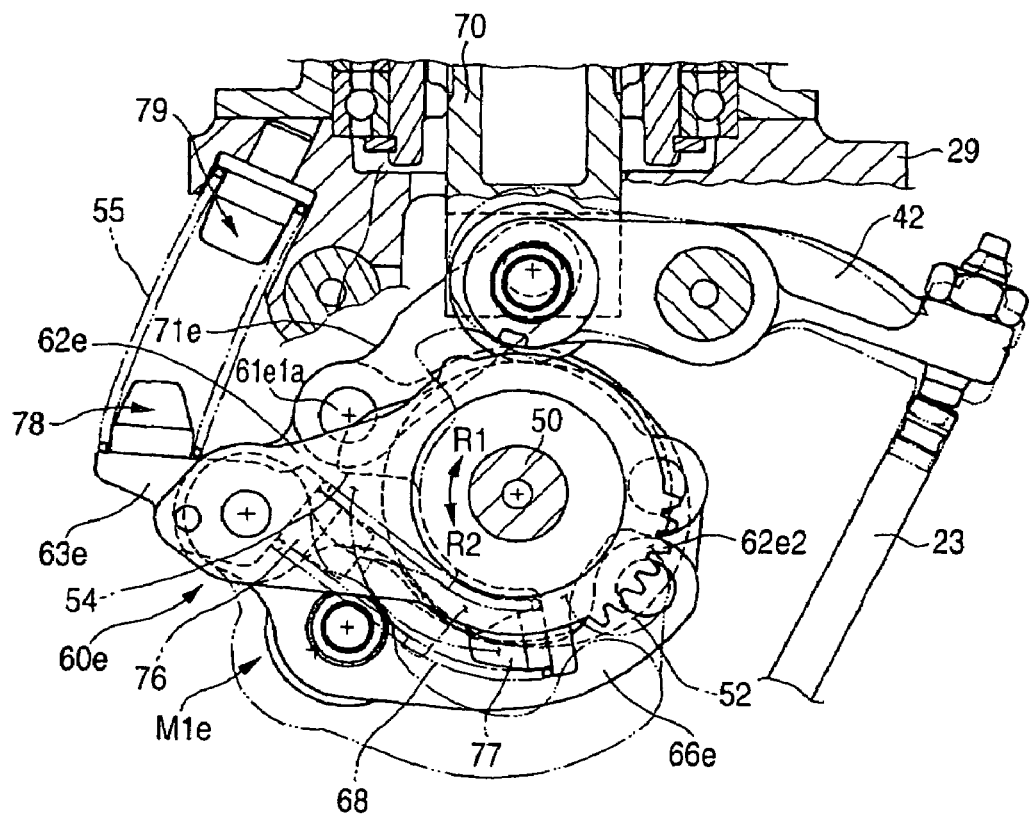
Figure 14:
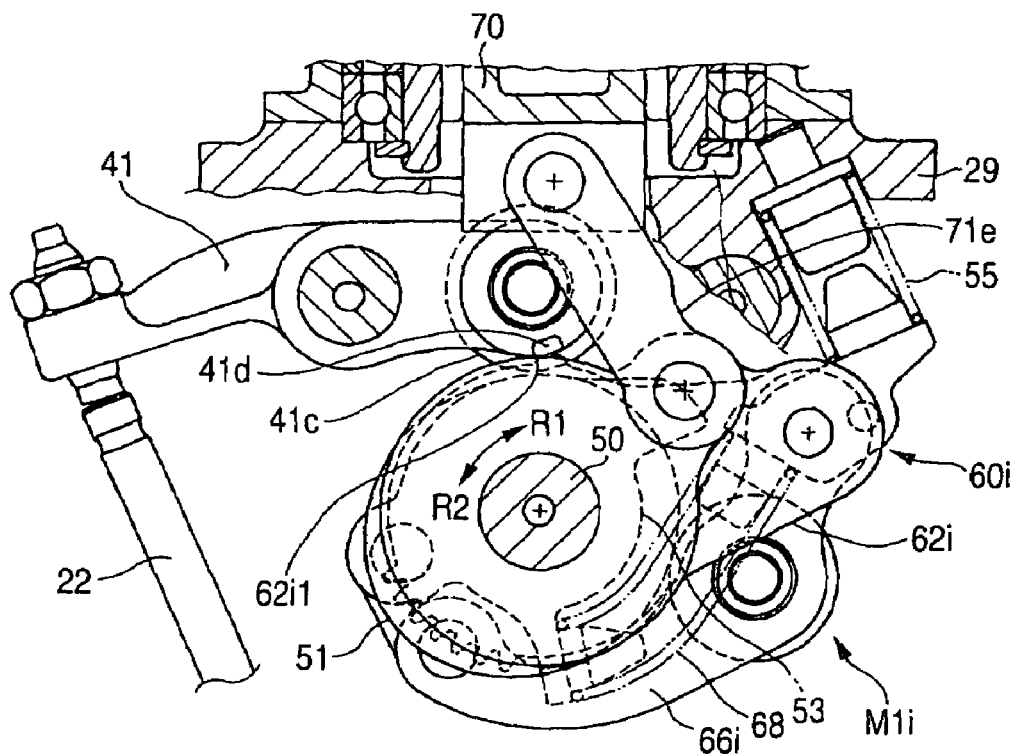
FIG. 14(A) is a view similar to FIG. 12(A) when a decompression operation characteristic is obtained for the intake valve.
FIG. 14(B) is a view similar to FIG. 12(B) when a decompression operating characteristic is obtained for the exhaust valve.
Figure 14:
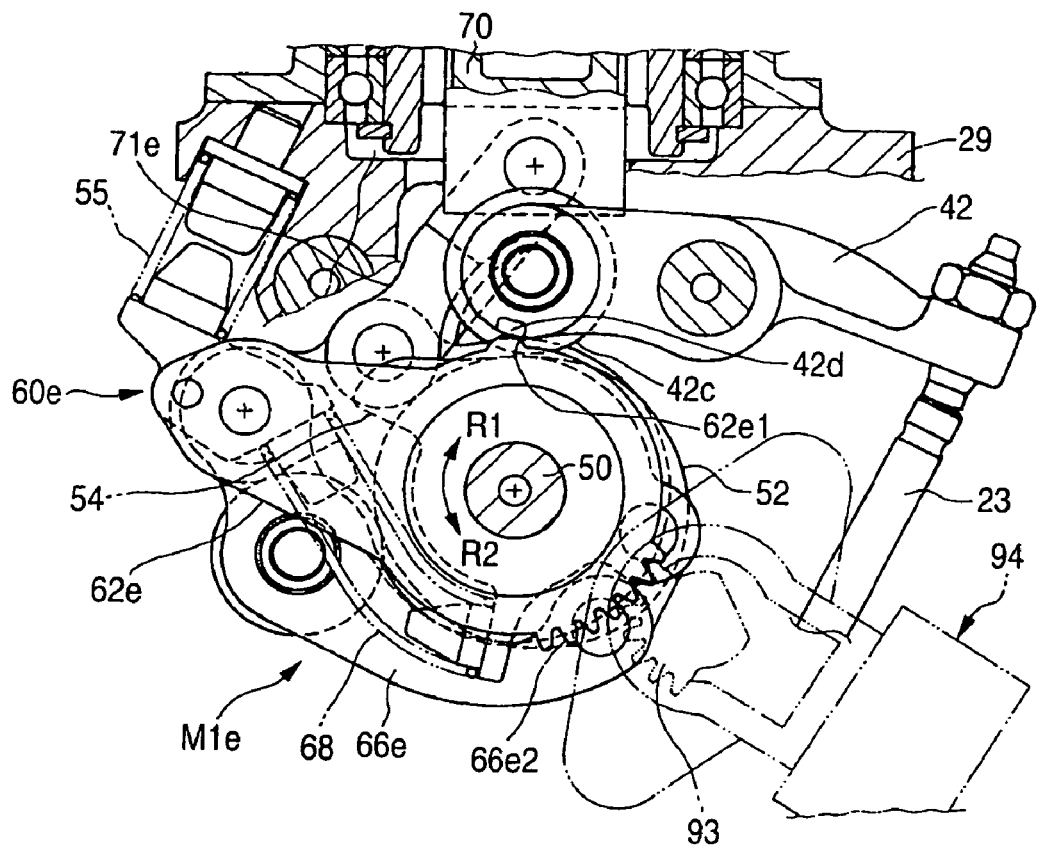

The detailed description is as follows:

As shown in FIG. 11, the intake valve and the exhaust valve open or close respectively according to basic operating characteristics of the valve operation characteristics Ki and Ke which are controlled by the valve characteristic varying mechanism M which changes the opening and closing timing and the maximum lift amount, i.e., an arbitrary intermediate operating characteristic between a maximum valve operation characteristic Kimax (Kemax) and a minimum valve operation characteristic Kimin (Kemin) in which the maximum valve operation characteristics Kimax and Kemax and the minimum valve operation characteristics Kimin and Kemin are used as boundary values. For this reason, in the intake valve 22, as the opening timing retards continuously, the closing timing advances continuously, the opening period becomes shorter continuously, the rotation angle of the camshaft 50 (or the crank angle which is the rotating position of the crankshaft 15) where the maximum lift amount can be obtained retards continuously, and the maximum lift amount becomes smaller continuously. Also, at the same time with the change in the valve operation characteristic of the intake valve 22, in the exhaust valve 23, as its opening timing retards continuously, the closing timing advances continuously, the opening period becomes shorter continuously, and the rotation angle of the camshaft 50 where the maximum lift amount can be obtained advances continuously and the maximum lift amount becomes smaller continuously.

Referring to FIGS. 12(A) and 12(B), when the control shaft 70 and the intake control link 71 which are driven by the driving mechanism M2 occupy the first position shown in FIGS. 12(A) and 12(B), the opening timing of the intake valve 22 becomes the most advanced angle position θiomax and its closing timing becomes the most retarded angle position θicmax, and the maximum valve operation characteristic Kimax in which both the opening period and the maximum lift amount become the maximum can be obtained. At the same time, the opening timing of the exhaust valve 23 becomes the most advanced angle position θeomax and its closing timing becomes the most retarded angle position θecmax, and the maximum valve operation characteristic Kemax in which both the opening period and the maximum lift amount become the maximum can be obtained.

In addition, in FIGS. 12(A), 12(B), 13(A), and 13(B), the state of the exhaust link mechanism M1e (the intake link mechanism M1i) and the exhaust main rocker arm 42 (the intake main rocker arm 41) are indicated by solid lines when the exhaust valve 23 (the intake valve 22) opens, and the state outline of the exhaust link mechanism M1e (the intake link mechanism M1i) and the exhaust main rocker arm 42 (the intake main rocker arm 41) is indicated by two-dot chain lines when the exhaust valve 23 (the intake valve 22) opens with the maximum lift amount.

When a valve operation characteristic is shifted from the state where the maximum valve operation characteristic Kimax (Kemax) can be obtained to the state where the minimum valve operation characteristic Kimin (Kemin) can be obtained by the valve characteristic varying mechanism M according to the operating state of the internal combustion engine E, the electric motor 80 drives to rotate the output gear 72, and the feed screw mechanism advances the control shaft 70 toward the camshaft 50. In this case, on the basis of the driving amount of the electric motor 80, the control shaft 70 rocks the intake link mechanism M1i and the intake cam 53 about the camshaft 50 in the rotation direction R1 through the intake control link 71i, and simultaneously rocks the exhaust link mechanism M1e and the exhaust cam 54 about the camshaft 50 in the reverse rotation direction R2 through the exhaust control link 71e.

Moreover, when the control shaft 70 and the exhaust control link 71e occupy the second position shown in FIGS. 13(A) and 13(B), the opening timing of the intake valve 22 becomes the most retarded angle position θiomin and its closing timing becomes the most advanced angle position θicmin, and the minimum valve operation characteristic Kimax in which both the opening timing and the maximum lift amount altogether become the minimum can be obtained. At the same time, the opening timing of the exhaust valve 23 becomes the most retarded angle position θeomin, and its closing timing becomes the most advanced angle position θecmin, and the minimum valve operation characteristic Kemin in which both the opening timing and the maximum lift amount become the minimum can be obtained.

Moreover, when the control shaft 70 is shifted from the second position to the first position, the electric motor 80 drive to rotate the output gear 82 in the counter direction, and the feed screw mechanism retreats the control shaft 70 to be separated from the camshaft 50. In this case, the control shaft 70 rocks the intake link mechanism M1i and the intake cam 53 about the camshaft 50 in the reverse rotation direction R2 through the intake control link 71i, and simultaneously rock the exhaust link mechanism M1e and the exhaust cam 54 about the camshaft 50 in the rotation direction R1 through the exhaust control link 71e.

In addition, when the control shaft 70 occupies a position between the first position and the second position, for the exhaust valve 23 (the intake valve 22), numerous intermediate valve operation characteristics such as the opening timing, the closing timing, the valve opening period and the maximum lift amount, which are set to values of valve operation characteristics between the maximum valve operation characteristic Kemax (Kimax) and the minimum valve operation characteristic Kemin (Kimin), can be obtained.

Moreover, in addition to the basic operating characteristic, the intake valve and the exhaust valve are respectively opened or closed according to an auxiliary operating characteristic by the valve characteristic mechanism M. Specifically, the fact that the decompression operating characteristic is obtained as the auxiliary operating characteristic will be described with reference to FIGS. 14(A) and 14(B). In the compression stroke at the starting of the internal combustion engine E, the electric motor 80 drives to rotate the output gear 82 in the counter direction, and the control shaft 70 occupies a decompression position where it retreats to be separated from the camshaft 50 over the first position. In this case, the exhaust link mechanism M1e (the intake link mechanism M1i) and the exhaust cam 54 (the intake cam 53) rock in the rotation direction R1 (the reverse rotation direction R2), and the decompression cam 62e1 (62i1) of the second plate 62e (62i) comes in contact with the decompression part 42d (41d) provided in the vicinity of the roller 42c (41c) of the exhaust main rocker arm 42 (the intake main rocker arm 41), and the roller 42c (41c) is separated from the exhaust cam 54 (the intake cam 53), and the exhaust valve 23 (the intake valve 22) opens with a small degree of decompression opening.

Referring to FIG. 11, the overlap period Pa and the non-overlap period Pb of the intake valve 22 and the exhaust valve 23 at the intake top dead center changes according to the valve operation characteristic of the intake valve 22 and the exhaust valve 23. In other words, at the maximum valve operation characteristics Kimax and Kemax, the maximum overlap period Pax can be obtained, and at the minimum valve operation characteristics Kimin and Kemin, the maximum non-overlap period Pbx can be obtained, and at the intermediate valve operation characteristic between both the maximum and minimum valve operation characteristics, the overlap period Pa decreases to be zero and the non-overlap period Pb increases from zero as the valve operation characteristic is shifted from the maximum Kimax (Kemax) to the minimum Kimin (Kemin). During the overlap period Pa, in the vicinity of the intake top dead center, the exhaust valve 23 and the intake valve 22 are open together, and the crank angle (or the rotation angle of the camshaft.) is in a range between the closing timing of the exhaust valve 23 and the opening timing of the intake valve 22. During the non-overlap period Pb, in the vicinity of the intake top dead center, the exhaust valve 23 and the intake valve 22 are open together, and the crank angle (or the rotation angle of the camshaft) is in a range between the closing timing of the exhaust valve 23 and the opening timing of the intake valve 22.

Also, as shown in FIG. 4(C), if the engine temperature detecting means 96 detects that the internal combustion engine is during warming-up, ECU 92 controls the electric motor 80 on the basis of the valve control map to control the valve operation characteristic of the intake valve 22 and the exhaust valve 23 so as to obtain the overlap period Pa fixed at a predetermined amount regardless of the operating amount D, specifically, the maximum overlap period Pax, over the entire load range of the internal combustion engine E. Here, during the warming-up, the valve characteristic varying mechanism M controls the valve operation characteristic so as not to form non-overlap period Pb over the entire load range by opening or closing the intake valve 22 and the exhaust valve 23 according to the maximum valve operation characteristics Kimax and Kemax.

In addition, if the engine temperature detecting means 96 detects that the internal combustion engine is after the warming-up, as shown in FIG. 4(D), ECU 92 makes the valve characteristic varying mechanism M control the valve operation characteristic to control the engine output with the control of the overlap period Pa or the non-overlap period Pb according to the operating amount D so as to obtain the engine output corresponding to the required amount in cooperation with the throttle valve 30 over the entire load range of the internal combustion engine E.

Referring to FIGS. 4(A) to 4(D) and 11, the valve characteristic varying mechanism M controls the valve operation characteristic to obtain the maximum non-overlap period Pbx before the non-overlap period Pb increases to reach a certain load Da, after the overlap period Pa decreases to be zero with an increase in the required amount in a first load range Fa, and to obtain the maximum overlap period Pax at the maximum load (the maximum operating amount) Db with the increase in the overlap period Pa, after the non-overlap period Pb decreases from the maximum non-overlap period Pbx to zero with the increase in the required amount in the second load range Fb.

The internal EGR rate N indicates the ratio of the amount of the fresh air in the combustion chamber 16 and the amount of the burned gas remaining in the combustion chamber 16, and is defined as the following equation.

$$N = Vce/(Vc - Vca)$$

here, Vc: cylinder volume at the intake bottom dead center

Vca: cylinder volume when the intake valve has the effective lift amount.

Vce: cylinder volume when the exhaust valve has the effective lift amount.

Effective lift amount of the intake valve: the lift amount of the intake valve when fresh air substantially begins to flow into the combustion chamber through the open intake valve from the intake port.

Effective lift amount of the exhaust valve: the lift amount of the exhaust valve when the burned gas substantially finishes flowing out the combustion chamber to the exhaust port through the open exhaust valve.

For this reason, the internal EGR rate N continuously increases from the minimum internal EGR rate Nn to the maximum internal EGR rate Nx as the valve operation characteristic is shifted from the maximum valve operation characteristics Kimax and Kemax to the minimum valve operation characteristics Kimin and Kemin in the control range which is defined by the minimum internal EGR rate Nn which can be obtained at the maximum overlap period Pax according to the maximum valve operation characteristics Kimax and Kemax, and the maximum internal EGR rate Nx which can be obtained at the maximum non-overlap period Pbx according to the minimum valve operation characteristics Kimin and Kemin.

Also, during warming-up of the engine, the valve characteristic varying mechanism M controls the valve operation characteristic of the intake valve 22 and the exhaust valve 23 to maintain the internal EGR rate N at the minimum internal EGR rate Nn regardless of the operating amount D over the entire load range. Also, after the warming-up, the valve characteristic varying mechanism M controls the engine output by using the internal EGR rate N or the internal EGR amount defined by the internal EGR rate N by controlling the overlap period Pa or the non-overlap period Pb according to the operating amount D over the entire load range. More specifically, after the warming-up, the valve characteristic varying mechanism M controls the valve operation characteristic of the intake valve 22 and the exhaust valve 23 to obtain the maximum internal EGR rate Nx before the internal EGR rate N increases with the increase in the operating amount D from the minimum internal EGR rate Nn of no-load and reaches a certain load Da in the first load range Fa, and controls the valve operation characteristic of the intake valve 22 and the exhaust valve 23 to obtain the minimum internal EGR rate Nn at the maximum load Db by decreasing the internal EGR rate N from the maximum internal EGR rate Nx at a certain load Da with the increase in the operating amount D.

In addition, if the effective opening timing that the intake valve 22 opens with the effective lift amount and the effective closing timing when the exhaust valve 23 opens with the effective lift amount are used as the opening timing when the intake valve 22 is separated from the valve seat 24 and actually opens, it is possible to indicate the overlap period Pa and the non-overlap period Pb with the effective overlap period Pae and the effective non-overlap period Pbe. Moreover, in the present embodiment, the effective lift amount of the intake valve 22 and the exhaust valve 23 are the same value.

Hereinafter, the control of the valve operation characteristic by the valve characteristic varying mechanism M will be described with the use of the effective non-overlap period Pbe defined by the effective opening timing and the effective closing timing. During warming-up, the valve characteristic varying mechanism controls the valve operation characteristic of the intake valve 22 and the exhaust valve 23 over the entire load range to fix both the effective overlap period Pae and the effective non-overlap period Pbe at zero, and after the warming-up, the valve characteristic varying mechanism controls the valve operation characteristic of the intake valve 22 and the exhaust valve 23 in the first load range Fa to increase the effective non-overlap period Pbe from zero of no-load to the maximum value at a certain load Da with the increase in the operating amount D, and in the second load range Fb to decrease the effective non-overlap period Pbe from the maximum value to zero at the maximum load when the operating amount D becomes the maximum with the increase in the operating amount D. In addition, in the present embodiment, the rotation angle (crank angle) of the camshaft 50 when the effective overlap period Pae and the effective non-overlap period Pbe become zero is the intake top dead center.

Also, when the effective overlap period Pae and the effective non-overlap period Pbe which can be obtained by the intake valve 22 and the exhaust valve 23 which open or close at the maximum valve operation characteristics Kimax and Kemax become the minimum value of zero, the internal EGR rate N becomes the minimum internal EGR rate Nn, and when the effective non-overlap period Pbe which can be obtained by the intake valve 22 and the exhaust valve 23 which open or close at the minimum valve operation characteristics Kimin and Kemin become the maximum value Pbex, the internal EGR rate N becomes the maximum EGR rate Nx.

Next, the operation and effects of the present embodiment constructed as described above will be described.

During the warming-up of the internal combustion engine E, the throttle controlling mechanism T controls the opening degree of the throttle valve 30 to increase the opening degree with the increase in the operating amount M over the entire load range of the internal combustion engine, and the valve characteristic varying mechanism M controls the valve operation characteristic of the intake valve 22 and the exhaust valve 23 so as not to form the non-overlap period over the entire load range, and the control of the internal combustion engine E is performed in the control mode during the warming-up to make the internal EGR rate N the minimum in the control range of the internal EGR rate N. Thereby, fresh air is controlled by the throttle valve 30 according to the operating amount D and supplied to the combustion chamber 16 over the entire load range during the warming-up. On the other end, since the non-overlap period Pb is not formed by the valve characteristic varying mechanism M, the internal EGR rate N becomes smaller than the internal EGR rate N when the non-overlap period Pb forms and is controlled to be the minimum in the control range of the internal EGR rate N. Thus, the combustibility improves, and the combustion temperature also becomes high over the entire load range, the combustibility improves. Therefore, the stability of the combustion improves and the combustion temperature becomes high, which promotes the warming-up of the internal combustion engine. In addition, because the combustion temperature becomes high, the warming-up of the catalyst device which is provided in the exhaust system and functions as the exhaust gas purifier is also promoted. Therefore, the activation of the catalyst device becomes faster, and the exhaust gas purification performance improves.

After the warming-up of the internal combustion engine E, the throttle controlling mechanism T controls the opening degree of the throttle valve 30 to make the throttle valve 30 fully open at a certain load Da from the idle opening degree with the increase in the operating amount D in the first load range Fa, and control the throttle valve 30 to fully open in the second load range Fb. The valve characteristic varying mechanism M controls the engine output by the internal EGR rate N by controlling the overlap period Pa or the non-overlap period Pb according to the operating amount D over the entire load range, and controls the internal combustion engine E in the post warming-up control mode to control a valve operation characteristic to obtain the maximum internal EGR rate Nx at the predetermined load Da by the maximum non-overlap period Pbx. As a result, the pumping loss further decreases and the fuel efficiency improves over the entire load range, especially, in the first load range. On the other hand, over the entire load range, the engine output is controlled at the internal EGR rate N by controlling the overlap period Pa and then on-overlap period Pb to obtain the engine output corresponding to the operating amount D. Thus, the pumping loss decrease and the amount of generation of NOx decreases, and the internal EGR rate N becomes the maximum at the predetermined load Da. Thus, the pumping loss and the amount of generation of NOx in the low-load range F1 in the vicinity of the predetermined load Da drastically decreases, which leads to improvement in the fuel efficiency and the exhaust gas purification performance.

Moreover, in the warming-up control mode, the valve characteristic varying mechanism M controls the intake valve 22 and the exhaust valve 23 to increase internal EGR rate N with the increase in the operating amount D from the minimum internal EGR rate Nn at no-load so as to obtain the maximum internal EGR rate Nx at the predetermined load Da in the first load range Fa, and to decrease internal EGR rate N with the increase in the operating amount D from the maximum internal EGR rate Nx at the predetermined load Da so as to obtain the minimum internal EGR rate Nn at the maximum load Db in the second load range Fb. As a result, in the first load range Fa, the internal EGR rate N increases to suppress the inflow of fresh air to the combustion chamber 16 caused by the large opening degree of the throttle valve. Thus, the pumping loss and the amount of generation of NOx decreases, and in the second load range Fb, the non-overlap period Pb decrease with the increase in the operating amount D and the internal EGR rate N decreases, and the amount of fresh air supplied to the combustion chamber 16 increases. Thus, as the load approaches the predetermined load Da, the internal EGR rate N becomes large. As a result, the pumping loss decreases, and the amount of generation of NOx decreases, so that the fuel efficiency and the exhaust gas purification performance improve. Also, in the high-load range Fc, large engine output can be obtained to secure a desired engine output corresponding to the required amount.

In the first load range Fa, the valve characteristic varying mechanism M controls the valve operation characteristic to obtain the maximum internal EGR rate Nx, or the maximum non-overlap period Pbx and the maximum effective non-overlap Period Pbex in the load range lower than the predetermined load Da. As a result, the pumping loss in the first load range Fa further decreases, the fuel efficiency improves, and the exhaust gas purification performance improves.

The valve characteristic varying mechanism M controls the valve operation characteristic to decrease the maximum lift amount of the intake valve 22 with the decrease in the overlap period Pa, the increase in the non-overlap period Pb, the increase in the effective non-overlap period Pbe from the state in which both the effective overlap period Pae and effective non-overlap period Pbe are zero, or the increase in the internal EGR rate N. As a result, when the overlap period Pa is large, when the non-overlap period Pb is small or when the internal EGR rate N is small, the maximum lift amount of the intake valve 22 is large. Thus, the pumping loss decreases. In addition, in the vicinity of the predetermined load Da, when the overlap period Pa is small, when the non-overlap period Pb is large, the effective non-overlap period Pbe is large, or when the internal EGR rate N is large, the large internal EGR rate decrease the pumping loss. Thus, the pumping loss in the first load range Fa and in the vicinity of the predetermined load Da decrease, and the fuel efficiency improves.

At the same time, the valve characteristic varying mechanism M controls the valve operation characteristic to decrease the maximum lift amount of the exhaust valve 23 with the decrease in the overlap period Pa, the increase in the non-overlap period Pb, the increase in the effective non-overlap period Pbe from the state that both the effective overlap period Pae and effective non-overlap period Pbe are zero, or the increase in the internal EGR rate N. As a result, when the overlap period Pa is large, when the non-overlap period Pb is small, when the effective overlap period Pbe is small, or when the internal EGR rate N is small, the maximum lift amount of the exhaust valve 23 is large. Thus, the pumping loss decreases. In addition, in the vicinity of the predetermined load Da, when the overlap period Pa is small, when the non-overlap period Pb is large, when the effective non-overlap period Pbe is large, or when the internal EGR rate N is large, the large internal EGR rate N decreases the pumping loss. Thus, the pumping loss in the first load range Fa and in the vicinity of a certain load Da decrease, and the fuel efficiency even at this point improves.

The valve characteristic varying mechanism M controls the valve operation characteristic to make the effective overlap period Pae and the effective non-overlap period Pbe zero at the maximum overlap period Pax or the minimum internal EGR rate Nn. As a result, the control of the internal EGR rate N begins in the control range of the internal EGR rate N on the basis of the time when the outflow of the burned gas from the combustion chamber 16 substantially stops and the inflow of fresh air to the combustion chamber 16 substantially begins. Therefore, the control accuracy of internal EGR rate N becomes high, and its control range can be expanded. Thus, the control accuracy of the engine output by the control of the internal EGR rate N or the effective non-overlap period Pbe can be improved.

In the valve characteristic varying mechanism M, when driven by the driving mechanism M2 in the direction that the internal EGR rate N increases due to the decrease in the overlap period Pa, the increase in the non-overlap period Pb or the effective non-overlap period Pbe, the controlling mechanism M3 connects the driving mechanism M2 to each of the link mechanisms M1i and M1e to make the retarded amount at the opening timing of the intake valve 22 by the intake link mechanism M1i larger than the advanced amount at the closing timing of the exhaust valve 23 by the exhaust link mechanism M1e. As a result, the valve characteristic varying mechanism M decrease the overlap period Pa and increases the non-overlap period Pb in the increasing direction of the internal EGR rate N, or when the effective overlap period Pbe is increased, the retarded amount at the opening timing of the intake valve 22 becomes larger than the advanced amount at the closing timing of the exhaust valve 23. Thus, when the pressure of the burned gas remaining in the combustion chamber 16 becomes high with the advance of the closing timing of the exhaust valve 23, comparing to the case in which the retarded amount of the opening timing of the intake valve 22 is smaller than the advanced amount of the closing timing of the exhaust valve 23, the intake valve 22 begins to open when the pressure of the combustion chamber 16 is lower. Thus, the blowing-back of the intake air is prevented or suppressed.

The pivotal center line L4i and the pivotal center line L4e are deviated to the exhaust side from the reference plane H0 and arranged parallel to the rotational center line L2, the pivotal center line L5i is disposed at the exhaust side and the pivotal center line L5e is disposed at the intake side. As a result, when the control shaft 70 moves, the intake link mechanism M1i rocks about the camshaft 50 by a larger rocking amount than the exhaust link mechanism M1e, whereby the valve operation characteristic in which the retarded amount at the opening timing of the intake valve 22 becomes larger than the advanced amount at the closing timing of the exhaust valve 23 can be obtained. Thus, the sharing of the control shaft 70 of the controlling mechanism M3 with the intake link mechanism M1i and the exhaust link mechanism M1e, and also the arrangement of the pivotal center line L4i, the pivotal center line L4e, the pivotal center line L5i and the pivotal center line L5e with respect to the reference plane H0 makes the size of the valve characteristic varying mechanism M smaller and makes its structure simpler.

The pivotal center line L4i and the pivotal center line L4e are arranged parallel to the rotational center line L2, the pivotal center line L5i is disposed at the exhaust side and the pivotal center line L5e is disposed at the intake side. The link length of the intake control link 71i is longer that of the exhaust control link 71e. As a result, when the control shaft 70 moves, the intake link mechanism M1i rocks about the camshaft 50 by a larger pivoting amount than the exhaust link mechanism M1e whereby the valve operation characteristic in which the retarded amount at the opening timing of the intake valve 22 becomes larger than the advanced amount at the closing timing of the exhaust valve 23 can be obtained. Thus, the control shaft 70 of the controlling mechanism M3 is shared with the intake link mechanism M1i and the exhaust link mechanism M1e. In addition, the pivotal center line L5i and the pivotal center line L5e are respectively arranged at either side of the reference plane H0, and the link length of the intake control link 71i is longer than that of the exhaust control link 71e, so that the size of the valve characteristic varying mechanism becomes smaller and its structure becomes simpler.

Moreover, the pivotal center line L4i and the pivotal center line L4e constitute the common pivotal center line. Thus, the size of the valve characteristic varying mechanism M becomes smaller and its structure becomes simpler.

Hereinafter, another embodiment in which a part of the construction of the above-described embodiment is modified described above will be described.

The predetermined load Da may be any load in the middle-load range F2. The opening and closing timings only of the exhaust valve of the opening and closing timings of the intake and exhaust valves may be changed to control the overlap period and the non-overlap period. The fuel supply system may be a fuel injection valve that directly injects fuel into the combustion chamber.

The internal combustion engine can be a multi-cylinder internal combustion engine. Also, an internal combustion engine in which a number of intake valves or exhaust valves are provided in a single cylinder or an internal combustion engine in which a plurality of exhaust valves and one or a plurality of intake valves are provided in a single cylinder may be used.

At the predetermined load Da and in the second load range Fb, the throttle valve 30 may open fully, and at the maximum overlap period Pax or the minimum internal EGR rate Nn, the effective overlap period Pae and the effective non-overlap period Pbe may be almost zero, and during warming-up, the internal EGR rate N may be almost the minimum over the entire load range. In this case, 'almost' means respectively the range with no meaningful difference in their operating effects compared to the case in which the internal EGR rate N is the minimum, when the throttle valve 30 opens fully, when the effective overlap period Pae and the effective non-overlap period Pbe are zero.

The present invention is described in detail referring to specific embodiments, however, it will be apparent to those skilled in the art that various modifications and variations can be made to the described embodiments without departing from the spirit or scope of the invention.

The present application is based on Japanese Patent Application (P.2004-012494), filed on Jan. 20, 2004, the contents of which are incorporated herein by reference.

INDUSTRIAL APPLICABILITY

According to the present invention, over the entire load range, especially, in a low-load range, or in a low-load range and an middle-load range, the pumping loss further decreases and thus the fuel efficiency improves. Also, over the entire load range, since the engine output is controlled by the internal EGR rate, the pumping loss and the amount of generation of NOx decrease. In addition, in a low-load range or an middle-load range in the vicinity of the predetermined load, the pumping loss and the amount of generation of NOx substantially decrease. Thus, the fuel efficiency and the exhaust gas purification performance improve.

In addition, the throttle valve controls the amount of fresh air supplied to the combustion chamber and the internal EGR rate is also small. Thus, the combustibility and the stability of the combustion improve over the entire load range, and the combustion temperature becomes high, which promote the warming-up of the internal combustion engine.

In addition, in the vicinity of the predetermined load in a low-load range or an middle-load range, the internal EGR rate becomes large. Thus, the fuel efficiency and the exhaust gas purification performance improve. Also, in the second load range, the internal EGR rate decreases with the increase in the required amount. Thus, in a high load range, the desired engine output corresponding to the required amount can be secured.

In addition, when the internal EGR rate is small in the first load range, the maximum lift amount becomes large, and when the internal EGR rate is large, due to the large internal EGR rate, the pumping loss decreases in the first load range and in the vicinity of the predetermined load, and the fuel efficiency improves.

In addition, the control accuracy of engine output can be improved by the control of the internal EGR rate or the effective non-overlap period since the control accuracy of the internal EGR rate becomes high and the control range also can be expanded.

The invention claimed is:

1. A control method of an internal combustion engine, for controlling an internal EGR rate by changing an opening timing and a closing timing of an intake valve and an exhaust valve to control an overlap period and a non-overlap period, said method comprising:

controlling a throttle position of a throttle valve in accordance with an increase of a required amount of an engine output, in a first load range of the internal combustion engine which covers from a no-load to a load in one of a low-load range and a middle-load range, so as to open the throttle valve from an idle opening degree to one of a full opening degree and an almost full opened degree at the load;

controlling the throttle position to one of the full opening degree and the almost full opened degree, in a second load range that is over the load;

controlling the engine output by controlling the overlap period and the non-overlap period in accordance with the required amount, in an entire load range; and controlling the non-overlap period to obtain a maximum internal EGR rate from a maximum non-overlap period at the load.

2. The method according to claim 1, further comprising:

controlling the throttle position to increase an opening degree of the throttle valve in accordance with the increase of the required amount, over the entire load range during warming-up of the internal combustion engine; and controlling a valve operation characteristic so as not to form the non-overlap period over the entire load range during warming-up.

3. The method according to claim 1, further comprising:

controlling a valve operation characteristic to increase the internal EGR rate in accordance with the increase of the required amount, in the first load range; and controlling the valve operation characteristic to decrease the internal EGR rate in accordance with the increase of the required amount, in the second load range.

4. The method according to claim 1, further comprising:

controlling a valve operation characteristic including a maximum lift amount of the intake valve; and controlling the valve operation characteristic to decrease the maximum lift amount in accordance with one of a decrease of the overlap period, an increase of the non-overlap period and an increase of the internal EGR rate.

5. The method according to claim 4, further comprising:

controlling the valve operation characteristic so that an effective overlap period and an effective non-overlap period become one of zero and almost zero at one of a maximum overlap period and a minimum internal EGR rate.

6. A control method of an internal combustion engine, for controlling an internal EGR rate by controlling a valve operation characteristic, comprising:

controlling a throttle position of a throttle valve in accordance with an increase of a required amount of an engine output, in a first load range of the internal combustion engine from a no-load to a load in one of a low-load range and a middle-load range, so as to open the throttle valve from an idle opening degree to at least an almost full opened degree at the load;

controlling the throttle position to at least the almost full opened degree, in a second load range that is over the load;

controlling the internal EGR rate and the engine output by controlling the valve operation characteristic in accordance with the required amount, in an entire load range; and controlling the valve operation characteristic to obtain the maximum internal EGR rate at the load.

7. The method according to claim 6, further comprising:
controlling the throttle position to increase an opening degree of the throttle valve in accordance with the increase of the required amount, in the entire load range, during warming-up of the internal combustion engine; and
controlling the valve operation characteristic so that the internal EGR rate is substantially minimized over the entire load range during the warming-up.

8. The method according to claim 6, further comprising:
controlling the valve operation characteristic to increase the internal EGR rate in accordance with the increase of the required amount, in the first load range; and
controlling the valve operation characteristic to decrease the internal EGR rate in accordance with the increase of the required amount, in the second load range.

9. The method according to claim 6, wherein the valve operation characteristic includes a maximum lift amount of the intake valve, further comprising:
controlling the valve operation characteristic to decrease the maximum lift amount in accordance with one of an decrease of an overlap period, an increase of a non-overlap-period and an increase of the internal EGR rate.

10. The method according to claim 9, further comprising:
controlling the valve operation characteristic so that an effective overlap period and an effective non-overlap period become one of zero and almost zero at one of a maximum overlap period and a minimum internal EGR rate.

11. A control apparatus of an internal combustion engine, comprising:
a throttle controlling mechanism for controlling a throttle position of a throttle valve that controls an amount of intake air;
a valve characteristic varying mechanism for controlling a valve characteristic including an opening timing and a closing timing of an intake valve and an exhaust valve, wherein the valve characteristic varying mechanism changes the closing timing of the exhaust valve to control an overlap period and a non-overlap period, thereby controlling an internal EGR rate, and
an output setting mechanism for setting a required amount of engine output,
wherein the throttle controlling mechanism controls the throttle position in accordance with an increase of the required amount, in a first load range of the internal combustion engine from a no-load to a load in one of a low-load range and a middle-load range, so that the throttle valve is opened from an idle opening degree to one of a full opening degree and an almost full opened degree at the load,
the throttle controlling mechanism controls the throttle position, in a second load range over the load, so that the throttle valve is opened in one of the full opening degree and the almost full opened degree,
the valve characteristic varying mechanism controls the engine output by controlling the overlap period and the non-overlap period in accordance with the required amount, in an entire load range, and
the valve characteristic varying mechanism controls the non-overlap period to obtain a maximum internal EGR rate from a maximum non-overlap period at the load.

12. The apparatus according to claim 11, wherein the throttle controlling mechanism controls the throttle position to increase an opening degree of the throttle valve in accordance with the increase of the required amount over the entire load range during warming-up of the internal combustion engine, and
the valve characteristic varying mechanism controls the valve operation characteristic so as not to form the non-overlap period over the entire load range during warming-up of the internal combustion engine.

13. The apparatus according to claim 11, wherein the valve characteristic varying mechanism controls the valve operation characteristic to increase the internal EGR rate in accordance with the increase of the required amount, in the first load range, and controls the valve operation characteristic to decrease the internal EGR rate in accordance with the increase in the required amount in the second load range.

14. The apparatus according to claim 11, wherein the valve operation characteristic includes a maximum lift amount of the intake valve, and the valve characteristic varying mechanism controls the valve operation characteristic to decrease the maximum lift amount of the intake valve in accordance with one of an decrease of the overlap period, an increase of the non-overlap period and an increase of the internal EGR rate.

15. The apparatus according to claim 14, wherein the valve characteristic varying mechanism controls the valve operation characteristic so that an effective overlap period and an effective non-overlap period is one of zero and almost zero at one of a maximum overlap period and a minimum internal EGR rate.

16. A control apparatus of an internal combustion engine, comprising:
a throttle controlling mechanism for controlling a throttle position of a throttle valve that controls an amount of intake air;
a valve characteristic varying mechanism for controlling a valve characteristic including a closing timing of an exhaust valve, wherein the valve characteristic varying mechanism varies the valve operation characteristics to control the internal EGR rate; and
an output setting mechanism for setting a required amount of engine output,
wherein the throttle controlling mechanism controls the throttle position in accordance with an increase of the required amount, in a first load range of the internal combustion engine from a no-load to a load in one of a low-load range and a middle-load range, so that the throttle valve is opened from an idle opening degree to one of a full opening degree and an almost full opened degree at the load,
the throttle controlling mechanism controls the throttle position, in a second load range which covers a load range over the load, so that the throttle valve is opened in one of the full opening degree and the almost full opened degree,
the valve characteristic varying mechanism controls the internal EGR rate and controls the engine output by controlling the valve operation characteristic in accordance with the required amount, in an entire load range, and
the valve characteristic varying mechanism controls the valve operation characteristics to obtain the maximum internal EGR rate at the load.

17. The apparatus according to claim 16, wherein the throttle controlling mechanism controls the throttle position to increase an opening degree of the throttle valve in accordance with the increase of the required amount over the entire load range during warming-up of the internal combustion engine, and the valve characteristic varying mechanism controls the valve operation characteristic so that the internal EGR rate is substantially minimized over the entire load range during the warming-up.

18. The apparatus according to claim 16, wherein the valve characteristic varying mechanism controls the valve operation characteristic to increase the internal EGR rate in accordance with the increase of the required amount, in the first load range, and controls the valve operation characteristic to decrease the internal EGR rate in accordance with the increase in the required amount in the second load range.

19. The apparatus according to claim 16, wherein the valve operation characteristic includes a maximum lift amount of the intake valve, and the valve characteristic varying mechanism controls the valve operation characteristic to decrease the maximum lift amount of the intake valve in accordance with one of an decrease of the overlap period, an increase of the non-overlap period and an increase of the internal EGR rate.

20. The apparatus according to claim 19, wherein the valve characteristic varying mechanism controls the valve operation characteristic so that an effective overlap period and an effective non-overlap period is one of zero and almost zero at one of a maximum overlap period and a minimum internal EGR rate.

* * * * *

UNITED STATES PATENT AND TRADEMARK OFFICE
CERTIFICATE OF CORRECTION

PATENT NO. : 7,472,685 B2
APPLICATION NO. : 10/577711
DATED : January 6, 2009
INVENTOR(S) : Kazuya Tanabe et al.

It is certified that error appears in the above-identified patent and that said Letters Patent is hereby corrected as shown below:

On the Title page:
Insert

--(30)    The Foreign Application Priority Data

Jan. 20, 2004    (JP)    ......................... 2004-012494--

Signed and Sealed this

Twenty-first Day of April, 2009

JOHN DOLL
*Acting Director of the United States Patent and Trademark Office*